US012775988B2

(12) United States Patent
Kuo et al.

(10) Patent No.: US 12,775,988 B2
(45) Date of Patent: Oct. 27, 2026

(54) MESH NETWORK AROUND CORE STORE WITH BEVERAGE ROBOT AND ASSOCIATED SYSTEMS AND METHODS

(71) Applicant: BOTRISTA, INC., San Francisco, CA (US)

(72) Inventors: Wu-Chou Kuo, San Francisco, CA (US); Yu-Wei Chen, New Taipei City (TW); Alexander Milton Friedman, San Francisco, CA (US)

(73) Assignee: BOTRISTA, INC., Dover, DE (US)

( * ) Notice: Subject to any disclaimer, the term of this patent is extended or adjusted under 35 U.S.C. 154(b) by 44 days.

(21) Appl. No.: 18/953,871

(22) Filed: Nov. 20, 2024

(65) Prior Publication Data

US 2026/0138860 A1 May 21, 2026

Related U.S. Application Data

(60) Provisional application No. 63/600,955, filed on Nov. 20, 2023.

(51) Int. Cl.
*B67D 1/12* (2006.01)
*A47J 31/44* (2006.01)
(Continued)

(52) U.S. Cl.
CPC .......... *G06Q 50/12* (2013.01); *A47J 31/4492* (2013.01); *A47J 31/521* (2018.08); *A47J 31/525* (2018.08); *B25J 9/1653* (2013.01); *B25J 9/1661* (2013.01); *B25J 9/1679* (2013.01); *B25J 11/0045* (2013.01); *B67D 1/1202* (2013.01);
(Continued)

(58) Field of Classification Search
CPC .......... G06Q 50/12; G06Q 10/063114; G06Q 10/06316; G06Q 30/0633; A47J 31/4492; A47J 31/521; A47J 31/525; B25J 9/1653; B25J 9/1661; B25J 9/1679; B25J 11/0045; B67D 1/1202; B67D 2210/00091; B67D 2210/00123; G07F 13/065
See application file for complete search history.

(56) References Cited

U.S. PATENT DOCUMENTS

2003/0079612 A1* 5/2003 Con .................... A47J 31/4485 99/275
2008/0201241 A1* 8/2008 Pecoraro ................ G06Q 30/06 715/765

(Continued)

*Primary Examiner* — Donnell A Long
(74) *Attorney, Agent, or Firm* — Birch, Stewart, Kolasch & Birch, LLP

(57) ABSTRACT

Systems and methods for operating a mesh network of beverage robots with one or more core vending locations are disclosed herein. For example, the method can include receiving an order for a beverage to be prepared by one or more beverage robots in a first vending location, wherein the beverage is associated with a recipe that is specific to a second vending location. Once received, the method can include retrieving the recipe for the beverage to allow the beverage robot(s) to prepare the beverage according to customer expectations at the second vending location and scheduling the beverage to be prepared by one of the beverage robot(s) in the first vending location. In some embodiments, the method includes scheduling the beverage to be prepared close to a planned and/or estimated pick-up time for the order.

20 Claims, 12 Drawing Sheets

(51) Int. Cl.

| | |
|---|---|
| ***A47J 31/52*** | (2006.01) |
| ***B25J 9/16*** | (2006.01) |
| ***B25J 11/00*** | (2006.01) |
| ***G06Q 10/0631*** | (2023.01) |
| ***G06Q 30/0601*** | (2023.01) |
| ***G06Q 50/12*** | (2012.01) |
| ***G07F 13/06*** | (2006.01) |

(52) U.S. Cl.

CPC ................ *G06Q 10/063114* (2013.01); *G06Q 10/06316* (2013.01); *G06Q 30/0633* (2013.01); *B67D 2210/00091* (2013.01); *B67D 2210/00123* (2013.01); *G07F 13/065* (2013.01)

(56) References Cited

U.S. PATENT DOCUMENTS

| | | | | |
|---|---|---|---|---|
| 2010/0198643 | A1* | 8/2010 | Friedman | A47J 31/52 700/285 |
| 2012/0035761 | A1* | 2/2012 | Tilton | B67D 1/0057 700/239 |
| 2013/0087050 | A1* | 4/2013 | Studor | A47J 31/525 99/279 |
| 2013/0317921 | A1* | 11/2013 | Havas | G06Q 30/0641 705/15 |
| 2015/0027315 | A1* | 1/2015 | Lussi | A47J 31/42 99/289 R |
| 2016/0027132 | A1* | 1/2016 | Craparo | G06Q 50/12 705/15 |
| 2016/0350837 | A1* | 12/2016 | Williams | G06Q 50/12 |
| 2016/0368752 | A1* | 12/2016 | Bethuy | B67D 1/0869 |
| 2017/0011319 | A1* | 1/2017 | Elliot | G06Q 10/06313 |
| 2021/0101793 | A1* | 4/2021 | Phillips | G01G 19/4146 |
| 2021/0330119 | A1* | 10/2021 | Väin | A47J 31/407 |
| 2023/0124838 | A1* | 4/2023 | Groff | G06Q 10/0874 705/28 |

* cited by examiner

MESH NETWORK AROUND CORE STORE WITH BEVERAGE ROBOT AND ASSOCIATED SYSTEMS AND METHODS

CROSS-REFERENCE TO RELATED APPLICATIONS

The present application claims priority to U.S. Provisional Patent Application No. 63/600,955, titled "FOOD STERILIZATION SYSTEM, INGREDIENT MIXING SYSTEM, MULTIPURPOSE BLENDING SYSTEM, BEVERAGE MENU GENERATOR, CONTAINER SQUEEZING DEVICES, FRYER APPARATUS, COFFEE PREPARATION APPARATUS, FLUID DISPENSING SYSTEM, AND RELATED CLOUD SYSTEM," filed Nov. 20, 2023, the entirety of which is incorporated herein by reference.

TECHNICAL FIELD

The present technology is generally directed to a mesh network of robots and more specifically to systems and methods for operating a mesh network of beverage and/or food robots to prepare individual items in an order.

BACKGROUND

Freshly made beverages are typically more desirable to consumers than factory-produced, canned or bottled beverages. For example, freshly made beverages can have superior taste, freshness, and/or customizability in the ingredients used in the beverage. Accordingly, restaurants, cafés, coffee shops, and/or other beverage vendors prefer to offer a menu of freshly made beverages. The fresh preparation, however, typically requires the time and attention of vendor personnel, which can slow down order production, causing customer dissatisfaction, reducing the volume of orders vendors can produce, and/or increasing the costs per order. To meet these challenges, vendors have increasingly automated portions, or all, of the production of beverages.

Automation brings about another set of challenges. For example, automating beverage productions requires that vendors be able to maintain, diagnose, and fix the automation systems. Additionally, vendors must be able to track and monitor ingredients and ingredient inventory for the automated systems to avoid preparing contaminated drinks. Still further, vendors must be able to track orders through the automated system to ensure customer satisfaction with the timing, resulting orders, and overall experience.

Figure 1:
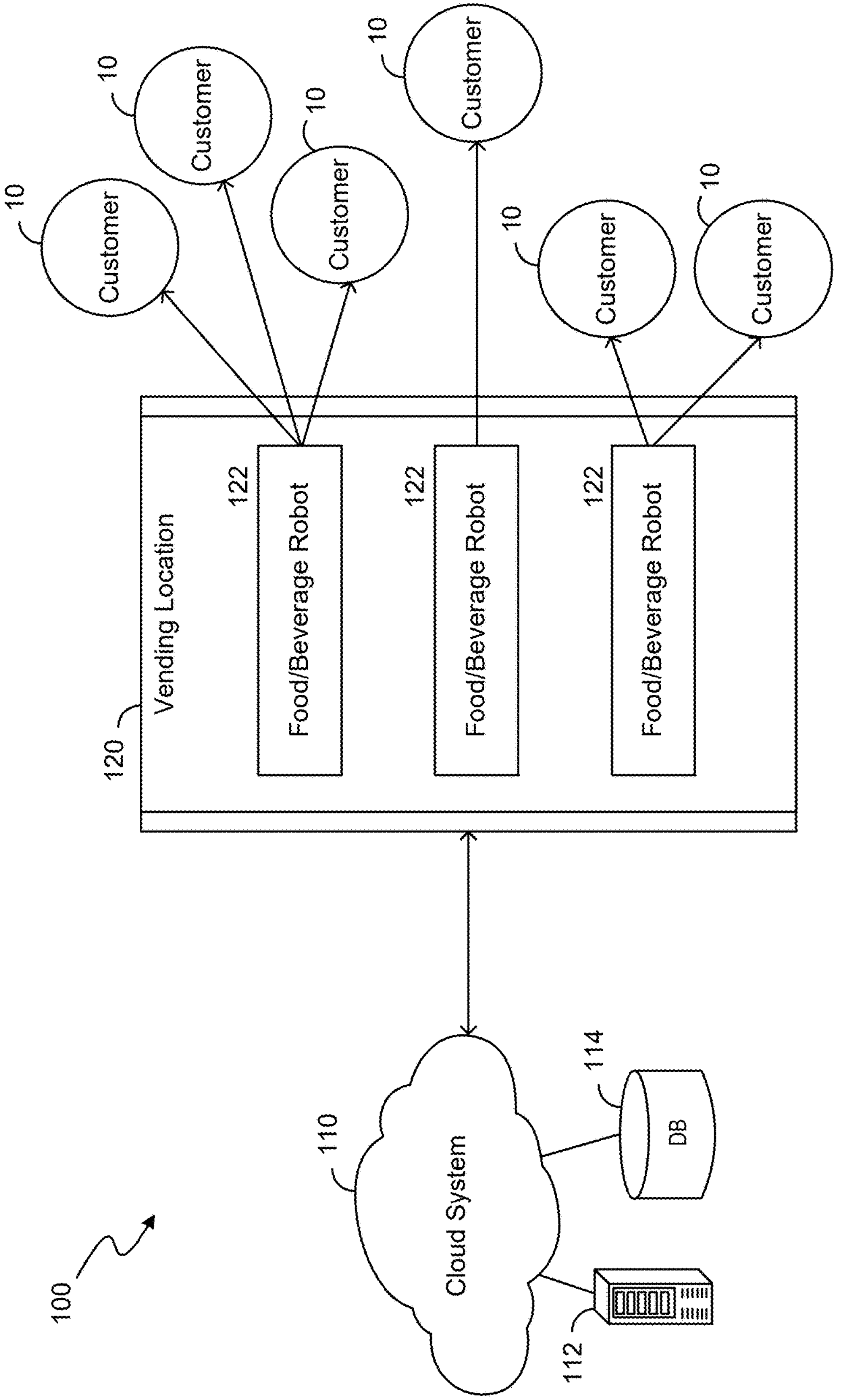
FIG. 1 is a schematic diagram of a system for operating food and/or beverage robots in accordance with some embodiments of the present technology.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

DETAILED DESCRIPTION

Overview

A mesh network of beverage robots located in one or more core vending locations to serve peripheral vending locations, and associated systems and methods, are disclosed herein. For example, the methods disclosed herein can include receiving an order for one or more beverages to be prepared by one or more beverage robots in a first vending location (e.g., a core vending location). Each of the beverage(s) can be associated with a recipe that is specific to a second vending location (e.g., a peripheral vending location). Once received, the method can include retrieving the recipe for each of the beverages to allow the beverage robot(s) to prepare each of the beverages with flavor profiles specific to the second vending location. Purely by way of example, recipes for lemonade can differ in their proportions between lemon juice, water, and sugar, thereby impacting a flavor profile associated with the resulting lemonade. Accordingly, by retrieving the recipe(s) specific to the second vending location, the method can allow the beverage robot(s) to prepare the beverage consistent with an expected flavor profile from the second vending location. The method can also include scheduling each of the beverages to be prepared by one of the beverage robot(s) in the first vending location. In some embodiments, the method includes scheduling the beverage to be prepared close to a planned and/or estimated pick-up time for the order.

For ease of reference, the food/beverage robots, and components thereof, are sometimes described herein with reference to top and bottom, upper and lower, upwards and downwards, and/or horizontal plane, x-y plane, vertical, or z-direction relative to the spatial orientation of the embodiments shown in the figures. It is to be understood, however, that the food/beverage robots, and components thereof, can be moved to, and used in, different spatial orientations without changing the structure and/or function of the disclosed embodiments of the present technology.

Further, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

Still further, although primarily discussed herein in the context of managing a mesh network of beverage robots, one of skill in the art will understand that the scope of the invention is not so limited. Purely by way of example, the methods disclosed with respect to FIGS. 7-12 can also be used to receive, assign, and manage orders from one or more food robots in addition to (or instead of) one or more beverage robots.

Conventional restaurants, cafés, coffee shops, tea shops, and/or the like prepare beverages in an order by hand. The manual preparation can be time-consuming, however, which can create a limit on the maximum volume of drinks that a vending location can prepare in a given window. Further, vending locations are typically forced to limit the range of beverage options to help streamline and/or simplify the manual preparation involved in creating the beverages. Still further, manual preparation can lead to inconsistencies between beverages due to human error, differences in staff, and/or the like.

To help address these issues, the systems and methods disclosed herein provide one or more beverage robots to a core vending location in a mesh network. Each of the beverage robots can store a variety of ingredients required to prepare a variety of beverages offered at the vending location and/or one or more peripheral vending locations in the mesh network (e.g., one or more vending locations around a core vending location in a food court). When any of the vending locations in the mesh network receives an order, the beverage robots can prepare the beverages to produce the order based on recipes for each of the beverages. The automatic preparation in the beverage robots can help increase throughput at the core vending location, allowing the core vending location (and/or the peripheral vending locations) to serve beverages during periods of increased demand (e.g., a lunch rush) without long wait times. Further, the beverage robots can more precisely follow the recipes to improve consistency in the quality of the beverages from the core vending location. Additionally, or alternatively, the beverage robots can allow each of the vending locations in the mesh network to provide a different set of beverages on their menus and/or to customize the recipe for the beverages specific to their vending location (e.g., adjusting a ration of lemon juice, water, and sugar in a lemonade recipe). Still further, beverage robots can allow each of the vending locations in the mesh network to offer a wider variety of beverages to their customers, especially when a network of multiple beverage robots with different ingredients is implemented in the core vending location.

The implementation of the network of beverage robots, however, can create numerous technical challenges. For example, in a normal production flow, orders are placed in a queue to be prepared based primarily on the time they are received. The ordering helps produce orders consistent with customer expectations on when they will be served. In the mesh network setting, however, a first customer that orders from a first peripheral vending location can arrive at the core vending location at a different time than a second customer ordering from a second vending location. In this situation, the first customer may submit their order earlier than the second customer but arrive at the core vending location after the second customer (e.g., based on travel times, wait times at the first and second peripheral vending locations for other items in their orders, and/or the like). As a result, the first and second customers may expect the second customer receive their order before the first customer, such that the traditional queuing will cause confusion and/or dissatisfaction. Additionally, or alternatively, the first customer may arrive at the core vending location long after their order is produced under traditional queuing, causing their order to be less fresh when they pick it up. In another example, while different vending locations can offer similar beverages (e.g., lemonade), each of the vending locations can prefer a different ratio and/or selection of ingredients for their beverage (e.g., different ratios of lemon juice, sugar, and water; different selections of ingredients and/or additions such as carbonated water vs. water, additional syrups (e.g., strawberry syrup), sugar vs. other sweeteners; and/or the like).

To overcome these technical deficiencies, the systems and methods disclosed herein include various processes for assigning and managing orders throughout their production. For example, as discussed in more detail below, the systems and methods disclosed herein use information received with an order and information on the queue at the beverage robots to determine pick-up times for the orders, estimate completion times for the orders, and actively manage the queues to help synchronize the completion time with the pick-up times (e.g., pausing order production, expediting orders, and/or the like). Additionally, or alternatively, as further discussed below, the systems and methods disclosed herein can retrieve information on recipes specific to each vending location in the mesh network to allow the beverage robots to prepare the beverages with flavor profiles specific to each of the vending locations in the network.

Examples of Suitable Systems for Operating Food and/or Beverage Robots in Accordance With Embodiments of the Present Technology FIG. 1 is a schematic diagram of a system 100 for operating food and/or beverage robots in accordance with some embodiments of the present technology. The system 100 can interconnect a remote system 110 with one or more vending locations 120 (one illustrated in FIG. 1) to operate one or more food/beverage robots 122 (three illustrated in FIG. 1) at each of the vending location(s) 120. As discussed in more detail below, the food/beverage robots 122 can automate the preparation of various food items and/or beverages for customers 10 at the vending location(s) 120. The automation, in turn, can allow the vending location(s) 120 to provide a wider variety of food items and/or beverages, increase the number of the customers 10 the vending location(s) 120 can serve, improve consistency in the taste of the food items and/or beverages, and/or increase transparency into a status of an order and/or an estimated completion time for the order.

As illustrated in FIG. 1, the remote system 110 can include one or more servers 112 (one illustrated in FIG. 1) as well as one or more databases 114 (one illustrated in FIG. 1). The server(s) 112 can be an edge server and/or a cloud-based server with one or more server computing devices configured to perform various operations in support of the food/beverage robots 122. Purely by way of example, as discussed in more detail below, the server(s) 112 can manage orders for food/beverages, queue orders between different sets of the food/beverage robots 122 and/or between different vending location(s) 120, manage and/or monitor food/beverage ingredients, monitor the operation of the food/beverage robots 122 (e.g., check cleaning status, monitor for part malfunctions, predict and/or schedule maintenance, and/or the like), maintain and/or share food/beverage recipes, modify recipes to account for variances in ingredients, and/or the like. The server(s) 112 can include various hardware, such as processing units (e.g., GPUs, CPUs, APUs, and/or the like), working memory, storage memory, input/output devices, displays (e.g., LCD display screens, LED display screens, OLED display screens, and/or the like), a network card, video card, audio card, USB ports, and/or the like. Further, the server(s) 112 are illustrated as a single server, the server(s) 112 can each be a distributed computing environment encompassing multiple computing devices located at the same or at geographically disparate physical locations. Further, the server(s) 112 can correspond to a group of servers supporting the food/beverage robots 122.

The database(s) 114 can warehouse (e.g., store) information, such as drink recipes, lot information or ingredients, stocking keeping units (SKU) information, part information, and/or the like. Though database(s) 114 is illustrated as a single unit, the database(s) 114 can each be a distributed computing environment encompassing multiple computing devices, can be located within one of the server(s) 112 (and/or within a computing device of the server(s) 112), or can be located at the same or at geographically disparate physical locations. The database(s) 114 can include one or more memories, each of which can include various hardware devices for volatile and non-volatile storage. For example, the memory can comprise random access memory (RAM), various caches, CPU registers, read-only memory (ROM), and writable non-volatile memory, such as flash memory, hard drives, CDs, flash drives, magnetic storage devices, and/or the like. The memory is not a propagating signal divorced from underlying hardware; the memory is thus non-transitory. Further, the memory can include sections, such as a program memory section that stores programs and software related to the operation of the food/beverage robots 122 and/or a data memory section that stores data related to the operation of the food/beverage robots 122.

The remote system 110 can be communicatively coupled to various computing devices at the vending location(s) 120 through a network connection (e.g., an internet connection, cellular network, and/or the like). For example, the communication be implemented through the network using TCP/IP protocols, a Q-LAN protocol, or others. In a specific, non-limiting example, each of the food/beverage robots 122 can include computing components that allow the food/beverage robots 122 to communicate individually (or collectively) with the remote system 110 and/or various other computing devices at the vending location(s) 120 (e.g., point-of-sale systems, on-site servers, and/or the like).

As discussed in more detail below, the communication can allow the remote system 110 to support and/or control (partially or fully) various operations of the food/beverage robots 122 and/or various related operations. For example, the vending location(s) 120 can be any location that serves food items and/or beverages (e.g., a store, café, coffee shop, tea shop, restaurant, food truck, brewery, bar, hotel, resort, conference center, stadium, entertainment center (e.g., a theater, music venue, arcade, bowling center, pool hall, theme park, and/or the like), and/or any other suitable location). The remote system 110 can communicate with the food/beverage robots 122 in the vending location(s) 120 to store and/or communicate recipes for orders; monitor ingredients available at the food/beverage robots 122; assign orders (or portions thereof) to the food/beverage robots 122; time the completion of orders based on other aspects of the order, a location of the customers 10, a location of a delivery person, and/or the like; monitor a cleaning and/or health status of the food/beverage robots 122; and/or any other suitable operation.

Figure 2:
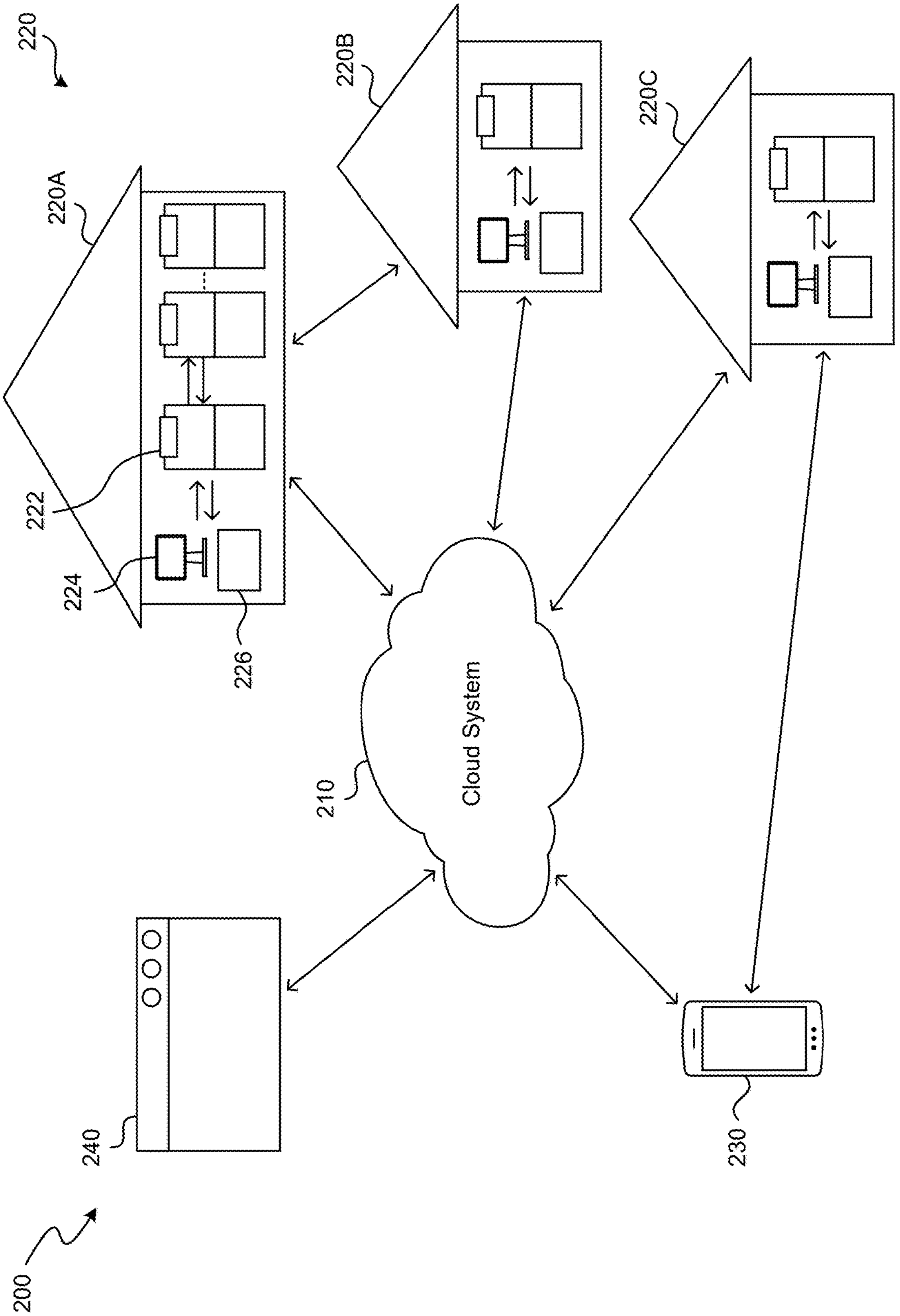
FIG. 2 is a schematic network diagram of a system for operating a network of food and/or beverage robots in accordance with some embodiments of the present technology.

FIG. 2 is a schematic network diagram of an environment in which embodiments of the present technology can operate. The environment can include a remote system 210 (e.g., a cloud computing system) generally similar (or identical) to the remote system 110 discussed above with respect to FIG. 1. For example, the remote system 210 can include one or more servers (e.g., the servers of FIG. 1) as well as one or more databases (e.g., the databases 114 of FIG. 1) that allow the remote system 210 to support and/or facilitate various operations in the environment 200. As further illustrated in FIG. 2, the environment 200 can also include one or more vending locations 220 (three illustrated in FIG. 2, referred to individually as first-third vending locations 220A-220C), one or more client computing devices 230 (one illustrated in FIG. 2), and one or more third-party platforms 240 (one illustrated in FIG. 2). As further illustrated in FIG. 2, the vending locations 220, client computing devices 230, and third-party platforms 240 are each communicatively coupled to the remote system 210 (e.g., via a network connection). As a result, as discussed in more detail below, the remote system 210 can help support, facilitate, and/or control operations at each of the vending locations 220, the client computing devices 230, and/or the third-party platforms 240. Additionally, or alternatively, the remote system 210 can provide a connection and/or facilitate communications between the vending locations 220, the client computing devices 230, and/or the third-party platforms 240.

Similar to the discussion above, the vending locations 220 can include any location providing food and/or beverage sales to customers. In a non-limiting example, the first vending location 220A can be a restaurant, the second vending location 220B can be a food truck, and the third vending location 220C can be a coffee shop. Further, each of the vending locations 220 can include one or more food/beverage robots 222, a point-of-sale (POS) system 224, and/or an onsite computing system 226. The food/beverage robots 222, the POS system 224, and the onsite computing system 226 can be communicably coupled by a network (e.g., the internet, a local area network (LAN), a wide area network (WAN), and/or the like), one or more wired connections, and/or various shortrange wireless communication components (e.g., Bluetooth®, Zigbee®, Z-Wave®, HaLow®, Wi-Fi, NearLink, near-field communication (NFC), low-power WAN, ultra-wideband (UWB), and/or the like). As a result, the food/beverage robots 222, the POS system 224, and the onsite computing system 226 can help partially (or fully) automate transactions and the production of orders received at each of the vending locations 220.

For example, as discussed in more detail below, the food/beverage robots 222 can store and/or have access to any suitable number of ingredients and automate the preparation of various food items and/or beverages. Purely by way of example, the food/beverage robots 222 can store a plurality of bag-in-boxes (BIBs) that each has concentrated ingredients for various different beverages (e.g., juice blends, sodas, teas, boba drinks, coffee drinks, energy drinks, matés, milk drinks, milkshakes, lemonades, flavored water, flavored sparkling water, mocktails, probiotic drinks, and/or the like). The food/beverage robots 222 can access one or more of the BIBs in response to an order and automatically mix the ingredients to prepare one or more beverages in the order. The POS system 224 can include various devices to receive and process transactions and generate orders for the food/beverage robots 222. For example, the POS system 224 can include cash registers, electronic terminals (e.g., touchscreen terminals), virtual terminals (e.g., accessible through an app on a customer's phone, a web browser, and/or the like), credit card readers, chip readers, and/or the like. Once a transaction is processed, for example, the POS system 224 can send the order(s) associated with the transaction to the food/beverage robots 222 to be prepared. The onsite computing system 226 can include desktop computers, laptops, server computing devices, databases and other storage devices, and/or the like to provide computational services (e.g., order processing, order distribution, order management, order change requests, recipe management, ingredient management, maintenance scheduling, cleaning scheduling, quality control, and/or the like) for the POS system 224 and/or the food/beverage robots 222. Said another way, the onsite computing system 226 can provide local services that support the operations discussed herein as additional, or peripheral, computing devices to the remote system 210.

The client computing devices 230 can include wireless smartphones, wireless tablets, desktop computers and other computer systems (e.g., server computers), wireless laptops, digital assistants, virtual assistants, other smart devices (e.g., smart watches, smart glasses, and/or the like), internet-of-things (IoT) devices, and/or the like. The client computing devices 230 allow users (e.g., customers, vending location staff and/or personnel, maintenance personnel, brand personnel, and/or the like) to access different components of the environment 200. For example, a customer can access the remote system 210 and/or the POS system 224 in any of the vending locations 220 through their smartphone to place an order. In another example, a manager at one of the vending locations 220 can access the remote system 210 and/or the food/beverage robots 222, the POS system 224, and/or the onsite computing system 226 through a laptop computer to monitor information on the vending locations 220 (e.g., stock levels for the ingredients, maintenance warnings/schedules, cleaning schedules, order history, order trends, and/or the like).

The third-party platforms 240 can be implemented on various suitable computing devices and/or systems (e.g., server computing systems, laptop computers, desktop computers, smart devices, and/or the like). The third-party platforms 240 can provide peripheral services to the remote system 210 and/or any of the other components in the environment 200. Purely by way of example, the third-party systems can include a sales, marketing, and deployment tracking platform (e.g., ClickUp and/or the like) that helps the remote system 210 monitor the deployment of the food/beverage robots 222, sales across the environment 200, and/or the like. Additionally, or alternatively, the sales, marketing, and deployment tracking platform can help any of the vending locations 220 monitor the deployment of the food/beverage robots 222, track their sales, market their food/beverage options, and/or the like.

In another example, the third-party platforms 240 can include a data visualization and analytics platform (e.g., Tableau, Looker, and/or the like). The data visualization and analytics platform can work with raw data from the remote system 210 and/or any of the vending locations 220 (or any specific components therein) to summarize and/or analyze the data. In a specific, non-limiting example, the data visualization and analytics platform can identify sales trends in the data for the remote system 210, allowing the remote system 210 to make recommendations to the vending locations 220 on what ingredients to stock, popular recipe trends, recipes trends specific to the vending location area and/or type, and/or the like. Additionally, or alternatively, the data visualization and analytics platform can record data on needed maintenance, maintenance schedules, cleaning schedules, and/or the like to help the remote system 210 and/or the vending locations 220 track the status of the food/beverage robots 222.

In yet another example, the third-party platforms 240 can include a customer support platform (e.g., Freshdesk and/or the like). The customer support platform can supplement (or provide) a service dashboard in the remote system 210 to help the remote system 210 provide services to the vending locations 220. In a specific, non-limiting example, the customer support platform can use the raw data (and/or analyses from the data visualization and analytics platform) to respond to calls from the vending locations 220 regarding the status of the food/beverage robots 222. Further, the customer support platform can help proactively monitor and manage the health of the food/beverage robots 222 (e.g., using data from the data visualization and analytics platform to schedule maintenance ahead of a breakdown). Additionally, or alternatively, the vending locations 220 can be connected to the customer support platform through the remote system 210 to provide customer support at the vending locations (e.g., answer questions about transactions, complaints about orders, suggestions for the vending locations 220, issue refunds, and/or the like).

In yet another example, the third-party platforms 240 can include an enterprise resource planning (ERP) platform. The ERP platform can help the remote system 210 and/or the vending locations 220 manage invoices, orders, inventory, and/or the like. In a specific, non-limiting example, the remote system 210 can be integrated with the ERP platform to track SKU information on the ingredients used in each of the food/beverage robots 222 to alert the vending locations 220 and/or automatically order additional inventory when the ingredients are low. Additionally, or alternatively, the vending locations 220 can access the ERP platform to help track the invoices associated with ingredients they order, and/or the like.

In yet another example, the third-party platforms 240 can include a third-party logistics (3PL) platform (e.g., Logiwa). The 3PL platform can help the remote system 210 manage warehouse and shipping logistics to provide and/or install the food/beverage robots 222 in the vending locations 220, provide and/or install parts for the food/beverage robots 222, provide ingredients for the vending locations 220, and/or the like. Additionally, or alternatively, the 3PL platform can help the remote system 210 manage various special orders (e.g., modifications to customize the food/beverage robots 222 to any of the vending locations 220, customized ingredient orders, and/or the like) from the vending locations 220.

Although discussed above as being connected through the remote system 210, the vending locations 220, the client computing devices 230, and/or the third-party platforms 240 can communicate directly. For example, as illustrated in FIG. 2, the first vending location 220A can directly communicate with the second vending location 220B. The direct communication can allow, for example, the first and second vending locations 220A, 220B to share orders (or portions thereof) independent from control and/or supervision from the remote system 210. The direct communication and independent control, in turn, can reduce the resources required in the remote system 210 to support the operation of the first and second vending locations 220A, 220B. In another example, the client computing device 230 can communicate directly with the third vending location 220C. The direct communication can allow, for example, the third vending location 220C to receive order(s) directly from the client computing device 230, without any delays relaying the order through the remote system 210.

Further, although the vending locations 220 are illustrated in FIG. 2 as each having at least one of the food/beverage robots 222, the POS system 224, and the onsite computing system 226, it will be understood that the systems and methods disclosed herein are not so limited. For example, any of the vending locations 220 can omit the food/beverage robots 222 and instead communicate with another of the vending locations 220 (directly or through the remote server) to produce orders. In another example, any of the vending locations 220 can omit the POS system 224 and/or the onsite computing system 226. Instead, the remote system 210 can receive, distribute, manage, and/or track orders on behalf of the vending locations 220 and/or provide any necessary computational services.

Figure 3:
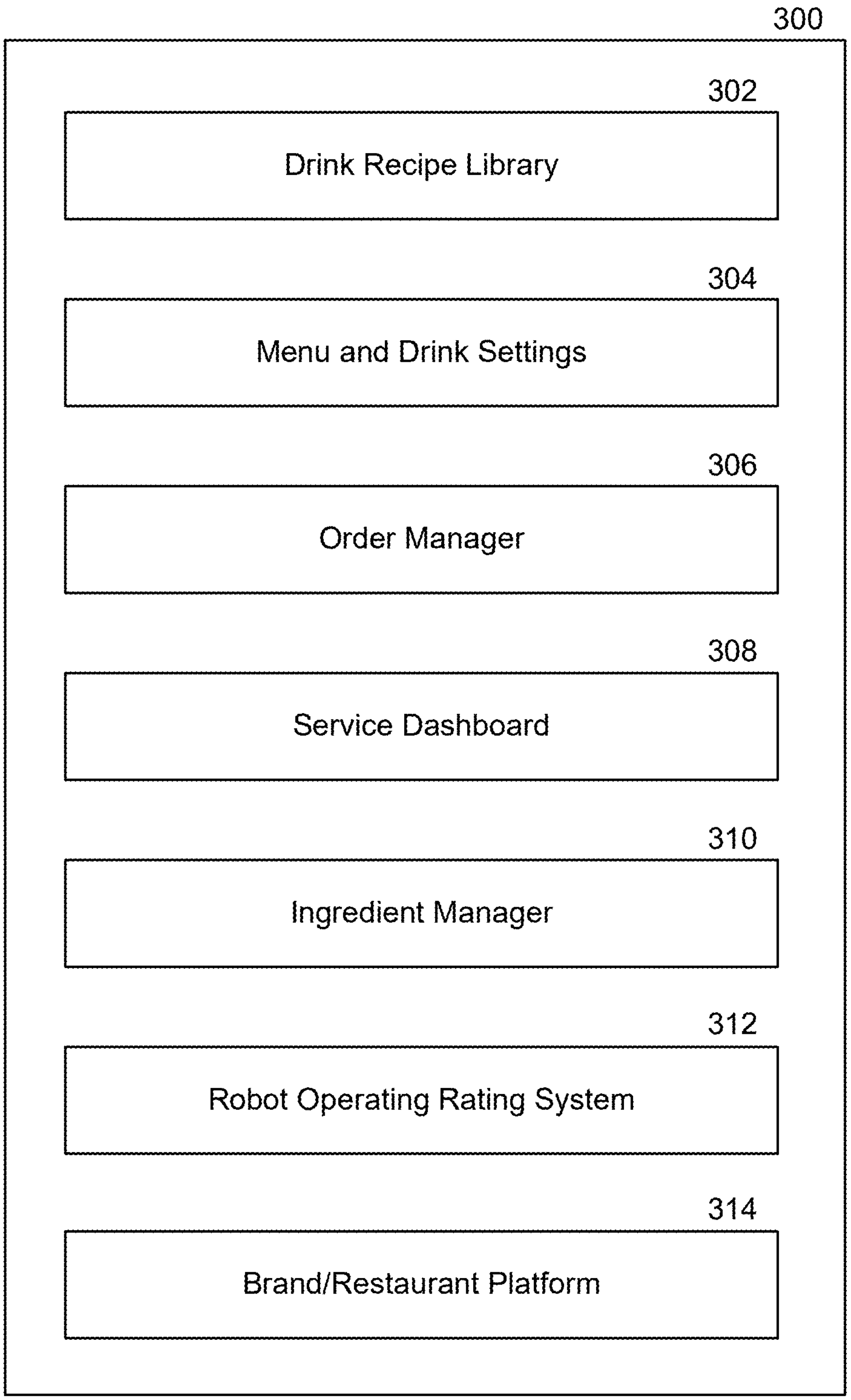
FIG. 3 is a block diagram of a platform for operating a network of beverage robots in accordance with some embodiments of the present technology.

FIG. 3 is a block diagram of a platform 300 for operating a network of beverage robots in accordance with some embodiments of the present technology. The platform 300 can be implemented in one or more computing devices, such as the remote system 210 discussed above with reference to FIG. 2, to help support, manage, and/or control operations in a variety of vending locations. For example, the platform 300 can be implemented on one or more processors of a computing system with access to any suitable number of storage components to facilitate the operations of the platform 300 as described herein. Further, as illustrated in FIG. 3, the platform 300 can include one or more modules (seven illustrated in FIG. 3, referred to individually as first-seventh modules 302-314), various examples of which are discussed in more detail below.

The first module 302 can include a drink recipe library. The drink recipe library can include information on the proportions of ingredients for a variety of beverages, such as juice blends, sodas, teas, boba drinks, coffee drinks, energy drinks, matés, milk drinks, milkshakes, lemonades, flavored water, flavored sparkling water, mocktails, probiotic drinks, and/or the like. In some embodiments, the recipes include specific ratios (e.g., percentages of different ingredients such as 5% a first juice, 5% a second juice, 1% simple syrup, 40% ice, and 39% water; ratios of ingredients such as 1 part tea concentrate, 0.5 parts ice, 1 part water; and/or the like). Additionally, or alternatively, the recipes can include various nutrient tables, acidity information, sweetness information, concentration information, and/or the like related to how a beverage should taste. In such embodiments, the drink recipe library can allow beverage robots to vary the exact ratios of ingredients to account for variations in the ingredients (e.g., using more or less of a juice concentrate based on variations in different batches, using more or less simple syrup to compensate for variations in the acidity of batches of coffee concentrate, and/or the like). Further, the drink recipe library can have recipes that allow beverage robots to produce beverages of any size, beverages in a range of sizes (e.g., common sizes such as 16 ounces (oz), 20 oz, 24 oz, and/or the like), and/or only beverages of a specified size (e.g., 16 oz of an energy drink to limit the caffeine provided in a single beverage).

Still further, the drink recipe library in the first module 302 can include a variety of generic recipes, a list of previously customized recipes, branded recipes, and/or the like. The generic recipes can be baseline recipe suggestions for a variety of drinks that a vending location can customize based on taste preferences and/or customer feedback. Any customized recipe can then be stored to be accessed, used, and/or customized by other vending locations. The branded recipes can be specific to drink and/or beverage brands (e.g., juice brands, sports drink brands, coffee brands, tea brands, soda brands, energy drink brands, health drink brands, smoothie brands, milkshake brands, and/or the like) and/or specific to vending locations (e.g., specific to stores of a specific a franchise name). The first module 302 (and/or a related module) can advertise the availability of the branded drinks but restrict access to the recipes until approved by the brand. For example, the first module 302 can require a vending location to pay an upfront fee and/or royalties to access a branded recipe. In another example, the first module 302 can allow a brand to review an access request to control where their branded drinks are available and/or check for quality control at the vending locations requesting access. Additionally, or alternatively, the first module 302 can monitor customized recipes for imitations of branded recipes to help prevent vending locations from copying branded drinks after accessing them once.

The second module 304 can help generate menu and drink settings for a vending location. For example, the second module 304 can keep track of the required ingredients for recipes as a vending location builds a menu, prevent the vending location from selecting recipes requiring additional ingredients once they reach a limit on the ingredients the beverage robots can store, and/or suggest additional beverages based on the ingredients at the vending location (e.g., other beverages that can be created without additional ingredients). Additionally, or alternatively, the second module 304 can use information about the vending location (e.g., restaurant type, sales in a surrounding area, demographic information around the vending location, seasonal information, and/or the like) to suggest recipes for the menu. Purely by way of example, the second module 304 can recommend that a pizza restaurant stock ingredients for lemonade, sodas, sports drinks, and/or the like based on those beverages typically selling well with pizza. In another example, the second module 304 can recommend a vending location near a university to stock ingredients for coffee, energy drinks, and/or the like based on demographic information for the vending location. Still further, once a vending location has selected recipes for their beverage robot(s), the second module 304 can generate a menu (e.g., a user interface for a virtual menu) with the recipes and provide the menu to the vending location POS and/or the beverage robot.

The third module 306 can provide an order manager to one or more vending locations. The order manager can queue orders (or individual beverages from orders) to be produced by the beverage robot(s). For example, the order manager can determine which beverage robot in a café will be able to produce an order fastest based on existing queues at each beverage robot in the café, then add the order to the queue at the chosen beverage robot. In some embodiments, orders are scheduled based on estimated completion times and estimated pick-up times. For example, when a customer orders through an app on their phone, the order manager can estimate when they will arrive at the café and delay the production of their order until closer to the arrival time. As a result, the order will be fresher when picked up than if the order had been queued and produced when received. In another example, the order manager can receive a take-out/delivery order for a beverage from a first restaurant, determine that a second restaurant can provide the beverage to the customer sooner, and present the customer with the option to receive the beverage from the second restaurant. By producing the order from a recipe with a beverage robot, the customer can then receive the same drink (as customized to the first restaurant) from the second restaurant. Further, the first and second restaurants can expand their sales by making the beverages more convenient/quicker to receive. In yet another example, the order manager can track the status of an order throughout the production process (e.g., by monitoring the position in the queue(s)) to provide customers with a real-time, accurate prediction of when their order will be complete. The increased transparency can increase customer satisfaction, particularly during busy times at a vending location. In yet another example, the order manager can receive customizations and/or order changes. Further, because the order manager can track the status of an order through production, the order manager can allow a customer to seamlessly make changes to their order until the order is prepared by the beverage robot(s).

The fourth module 308 can provide a service dashboard for vending location personnel and/or personnel associated with the beverage robots. The service dashboard can provide a record of statistics and data from the beverage robots (e.g., past and scheduled maintenance, health status of beverage robots, cleaning status of beverage robots, usage of beverage robots, and/or the like). In a specific, non-limiting example, the service dashboard can show that one or more tubes in a beverage robot are locked, along with an error code explaining why they are locked (e.g., spoiled ingredients, required cleaning, connection malfunction, and/or the like). As a result, the service dashboard can allow personnel associated with the beverage robots to respond to inquiries from vending locations and/or guide them through correcting the error. Additionally, or alternatively, the service dashboard can allow vending location personnel to address issues without contact with other maintenance personnel. In some embodiments, the service dashboard in the fourth module 308 can communicate with one or more additional modules (e.g., the sixth module 312 discussed in more detail below) to provide information related to the health status of beverage robots, cleaning data related to the beverage robots, usage of the beverage robots, and/or the like.

The fifth module 310 can include an ingredient manager. The ingredient manager can receive SKU information for shipments to vending locations and ingredient packages (e.g., BIBs) as they are used by the beverage robots. The ingredient manager can use the SKU information to track ingredient consumption in vending locations. Additionally, or alternatively, the ingredient manager can track and/or identify ingredients from specific batches (e.g., to prompt the first module 302 to adjust a recipe for variations between batches, identify recalled batches, and/or the like). Further, the ingredient manager can track ingredient expiration dates (e.g., milk and other spoilable ingredients) and prompt vending locations to replace ingredients close to their expiration. Still further, the ingredient manager can receive information from one or more sensors in the beverage robots related to ingredients remaining in a package (e.g., dispensing information, weight measurements, volume measurements, and/or the like) to help track and manage inventory for a vending location. The ingredient manager can then prompt a vending location to replace (or plan to replace) empty packages in the beverage robots, order more packages as their inventory goes down, and/or the like. In some embodiments, the ingredient manager automatically manages inventory (e.g., tracks and orders inventory) for a vending location to make sure they are stocked on ingredients. In some such embodiments, the ingredient manager accounts for sales trends, sales forecasts, and/or the like while managing inventory. Purely by way of example, the ingredient manager can stock additional ingredients for cold beverages ahead of a heat wave in anticipation of increased sales to make sure the vending location has adequate inventory.

The sixth module 312 includes a robot operating rating system. The robot operating rating system can use data from beverage robots at a vending location to evaluate and/or grade the vending location. For example, the robot operating rating system can consider data related to cleaning cycles and cleaning times of the beverage robots, error codes and responses to error codes, employee certification and training, inventory management from vending locations, shelf-life management from vending locations, and/or the like. The data can then be used to generate food safety ratings, grade the operation of the beverage robots, improve quality control for the operation of the beverage robots, and/or the like. The sixth module 312 can then use the ratings to adjust maintenance schedules for the beverage robots (e.g., increase maintenance when vending locations do not respond well to error codes), adjust the operation of the beverage robots (e.g., prevent robots from dispensing spoiled ingredients), and/or provide the ratings to franchise owners and/or brands to help monitor the vending locations for quality control.

The seventh module 314 can provide a platform for brands/vending locations to market themselves and/or interact. For example, brands can create beverage recipes that they market through the seventh module. Vending locations can review available brands as they generate (or refresh) their menu offerings, then contract with the brands through the seventh module 314. Additionally, or alternatively, brands can contact vending locations through the seventh module to place their beverages in a variety of locations. Further, the seventh module 314 can communicate with various other modules on the platform 300. Purely by way of example, the seventh module 314 can communicate with the sixth module 312 to make ratings of vending locations available to brands as they decide whether to contract with a vending location. Similarly, the seventh module 314 can obtain sales data associated with branded drinks to provide the sales data to vending locations as they decide whether to work with a brand. As a result, the seventh module 314 can help increase transparency between brands and vending locations, increase quality control for branded beverages, and/or the like.

Figure 4:
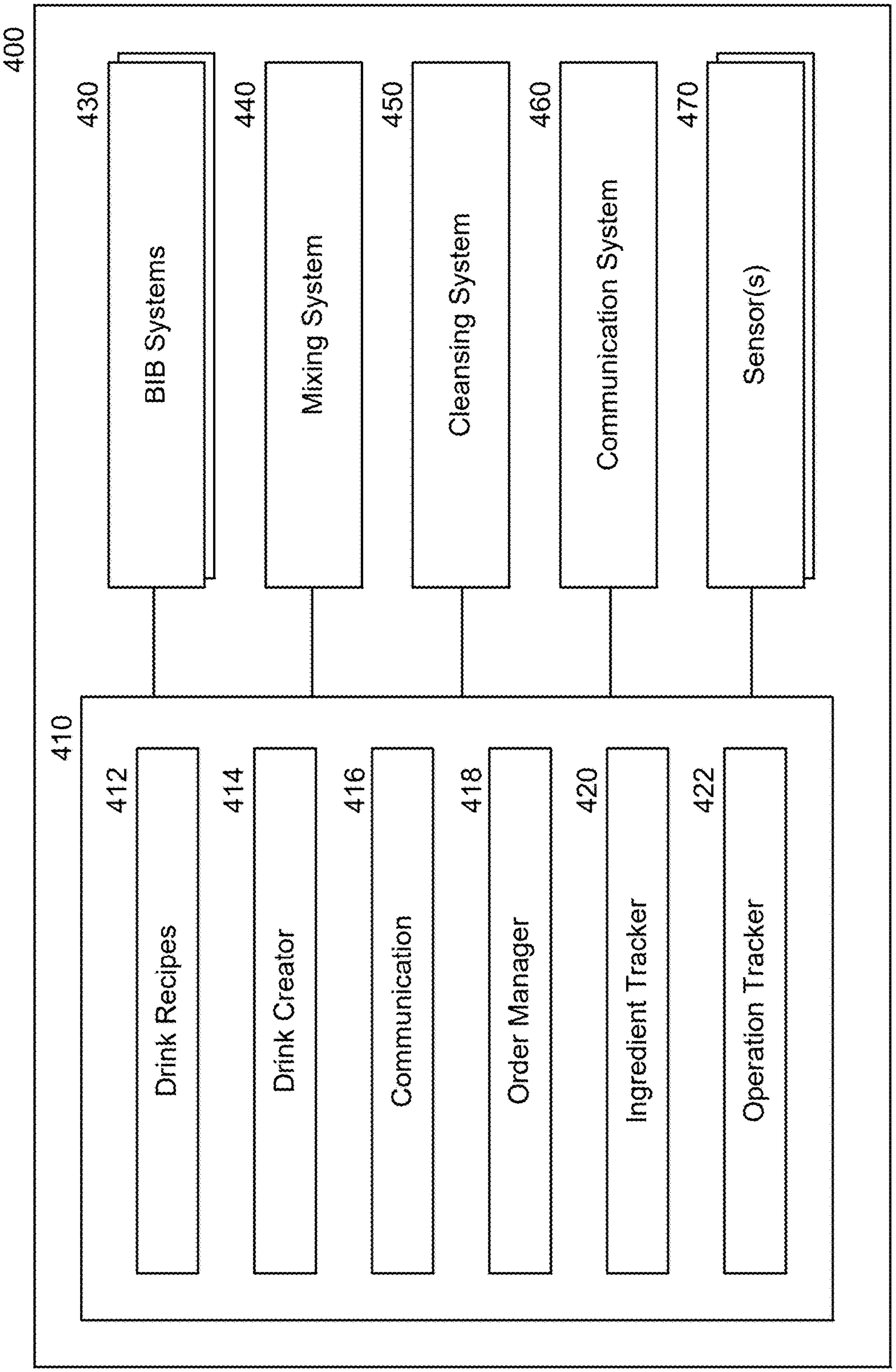
FIG. 4 is a block diagram of a subsystem for a beverage robot in accordance with some embodiments of the present technology.

FIG. 4 is a block diagram of a subsystem 400 for a beverage robot in accordance with some embodiments of the present technology. The subsystem 400 can be deployed, for example, in the food/beverage robots 222 discussed above with respect to the environment 200 of FIG. 2. A processor and/or a storage component are not illustrated in FIG. 4 to avoid obscuring the illustrated components of the subsystem 400. However, one of skill in the art will understand that the subsystem 400 can include one or more processors and any suitable number of storage components to facilitate various operations of the subsystem 400 described herein.

As illustrated in FIG. 4, the subsystem 400 includes an operating platform 410 ("platform 410") with one or more modules (six shown, referred to individually as first-sixth modules 412-422), as well as one or more BIB systems 430 (and/or other suitable ingredient containers), a mixing system 440, a cleansing system 450, a communication system 460, and one or more sensors 470.

The BIB systems 430 can store various concentrated ingredients related to beverage offerings from the subsystem 400. The mixing system 440 can receive and mix ingredients from the BIB systems 430 according to a recipe in a relatively short time (e.g., in less than a minute per beverage, less than 40 seconds per beverage, less than 30 seconds per beverage, and/or the like). In various embodiments, the mixing system 440 can include a blending component, shaking component, stirring component, emulsifying component, and/or any other suitable system to mix the ingredients according to the recipe. The cleansing system 450 can clean the mixing system 440, and/or any tubing and/or valves between the BIB systems 430 and the mixing system 440. The cleansing system 450 can be configured to operate between each beverage to avoid flavor contamination between beverages. Additionally, or alternatively, the cleansing system 450 can operate periodically to kill bacteria and/or build up in the tubing and/or valves.

The communication system 460 can operably couple the subsystem 400 to various other subsystems and/or platforms, such as other beverage robots, the POS system 224 of FIG. 2, and/or the platform 300 of FIG. 3. In various embodiments, the communication system 460 can include components configured to communicate over a shortrange wireless standard (e.g., a Bluetooth®, Zigbee®, Z-Wave®, Wi-Fi HaLow®, or any other suitable shortrange standard), communicate with a network over a wireless (or wired) internet connection (e.g., a WiFi connection or ethernet connection), and/or communicate with the network through a cellular internet connection (e.g., based on a 3G, 4G, LTE, 5G, 6G, or other standard).

The sensors 470 can be coupled to various components of the subsystem 400 to help monitor the operation of the beverage robot. For example, the sensors can include weight and/or volume sensors coupled to the BIB systems 430 to measure remaining ingredients in each BIB; temperature sensors in the BIB systems 430 to help monitor a freshness and/or status of ingredients; volumetric dispensing sensors to monitor the volume of ingredients provided to the mixing system 440; operating sensors coupled to the cleansing system 450 to monitor a frequency of cleansing; and/or the like. Additionally, or alternatively, the sensors 470 can include sensors that monitor connections between the BIB systems 430 and the mixing system 440 to make sure tubes, valves, and/or nozzles are properly connected and in good health; and/or other sensors to monitor a health condition of the beverage robot.

The platform 410 can be operably coupled to each of the BIB systems 430, the mixing system 440, the cleansing system 450, the communication system 460, and/or the sensors 470 to facilitate various operations of the beverage robot via the first-sixth modules 412-422 (and/or any other suitable modules). For example, the first module 412 can store drink recipes specific to the beverage robot, access the drink recipe library in the first module 302 of FIG. 3, and share drink recipes with other beverage robots (e.g., to allow the other beverage robots to prepare the recipe) and/or receive recipes from other beverage robots. Further, the first module 412 can communicate with a POS system and/or other user interface to share information on the beverages available in the subsystem 400.

The second module 414 includes a drink creator. The drink creator can allow a vending location to customize a drink recipe from the first module 412 (e.g., adjusting the portions of ingredients, adding or removing ingredients, changing an order the ingredients are added/mixed, and/or the like). Accordingly, the drink creator can allow the vending location to customize generic recipes to preferences of the vending location. Additionally, or alternatively, the drink creator in the second module 44 can communicate with a POS system and/or other user interface to allow a user (e.g., a customer) to customize a beverage to their preferences (e.g., to change milk types, remove an ingredient, add an ingredient, and/or the like).

The third module 416 can include a communication manager. The communication manager can work with any of the modules in the platform 410 and/or any of the other components of the subsystem 400 to communicate outside of the subsystem 400. In a specific, non-limiting example, the communication manager can help direct communications between the first module 412 and a drink library in the remote system 210 of FIG. 2 to move drink recipes therebetween. In another specific, non-limiting example, the communication manager can send data from the sensors 470 to the robot operating rating system in the sixth module 312 discussed above with reference to FIG. 3.

The fourth module 418 can include an order manager. Similar to the order manager discussed above with reference to FIG. 3, the order manager can queue orders (or individual beverages from orders) to be produced by the beverage robot associated with the subsystem 400 and/or various other beverage robots in communication with the subsystem 400. For example, the order manager can queue orders at beverage robots with shorter wait times and the necessary ingredients. Additionally, or alternatively, the order manager can queue orders to sync estimated completion times with estimated pick-up times. In another example, the order manager can track the status of an order throughout the production process (e.g., by monitoring the position in the queue(s)) to provide customers with a real-time, accurate prediction of when their order will be complete. The increased transparency can increase customer satisfaction, particularly during busy times at a vending location. In yet another example, the order manager can receive order changes after an order is queued, modify the order in the queue, then produce the order. The on-site accessibility of the order manager can increase a speed of the order management and/or allow a vending location to override order queuing directly from the subsystem 400.

The fifth module 420 can include an ingredient tracker. Similar to the ingredient manager discussed above with reference to FIG. 3, the ingredient tracker can help monitor a volume of ingredients remaining in each of the BIB systems 430, track an age of the ingredients in the BIB systems 430, and/or the like. As a result, the ingredient tracker can notify a vending location when one of the BIB systems 430 needs to be replaced or will need to be replaced soon. Additionally, or alternatively, the ingredient tracker can help monitor overall volumes of ingredients used during a relevant time period to identify popular (or unpopular ingredients). The information can be useful, for example, in managing the vending location's inventory and orders related to various ingredients. Still further, the ingredient tracker can help identify ingredients approaching their expiration date, prompt the vending location to change the ingredients, and/or prevent the subsystem 400 from vending expired ingredients.

The sixth module 422 can include an operation tracker. The operation tracker can be communicably coupled to the order manager in the fourth module 418, the BIB systems 430, the mixing system 440, the sensors 470, and/or any other suitable components of the subsystem 400 to record operations thereof. As a result, the operation tracker can help track drink sales, identify cleaning and/or maintenance patterns, ensure the BIB systems 430 are properly installed, track how often the BIB systems 430 are swapped, whether the correct BIB systems 430 are swapped, whether the mixing system 440 is properly cleaned between orders, and/or the like. The information can be used by the vending location to help improve sales, identify popular (or unpopular) beverages, improve quality control, monitor staff operations, and/or the like. Additionally, or alternatively, the information can be used to schedule (or predict) maintenance for the beverage robot. Additionally, or alternatively, the information can be shared with an external system, such as the service dashboard and/or robot operating rating systems discussed above with reference to FIG. 3.

Figure 5:
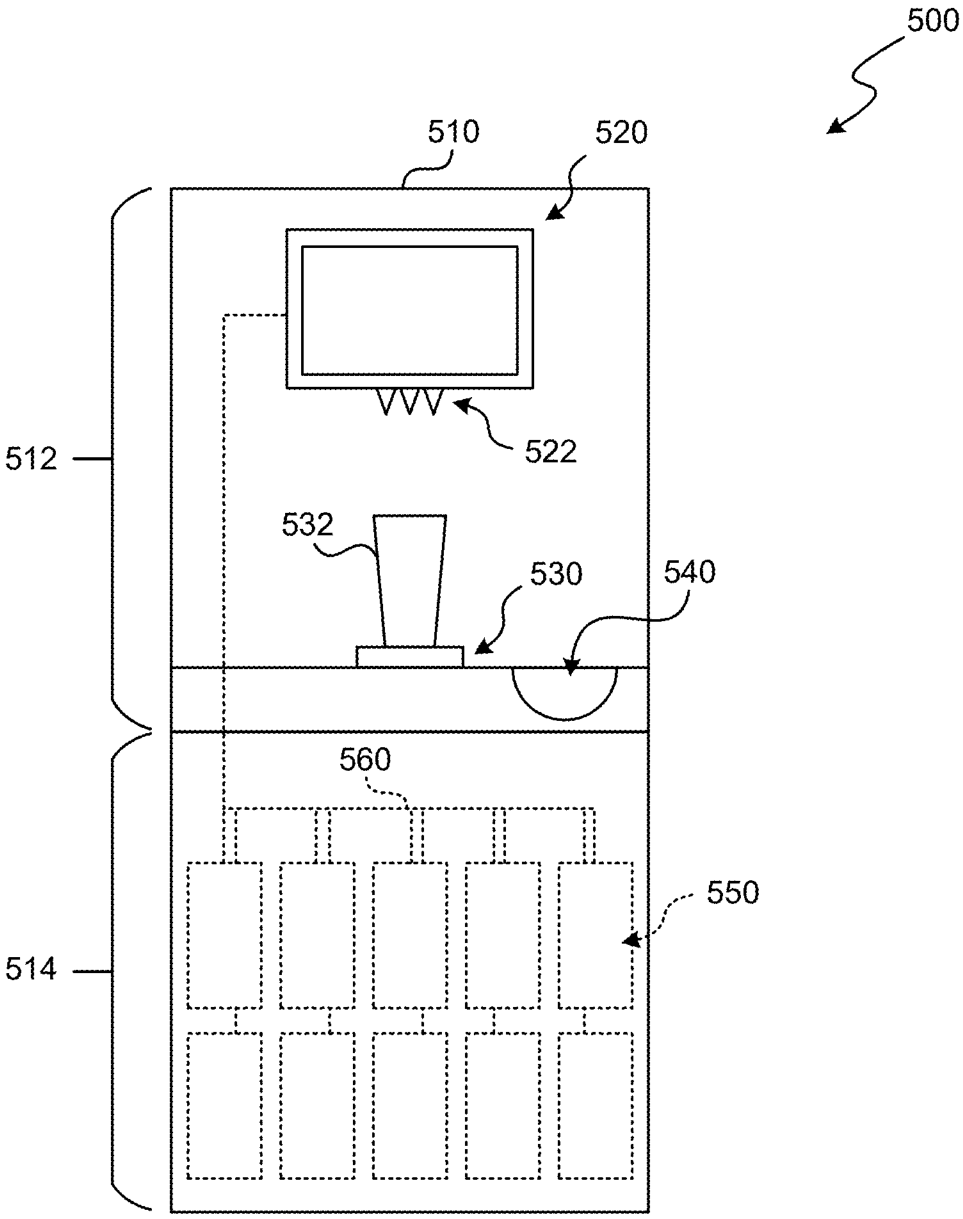
FIG. 5 is a schematic front view of a beverage robot configured in accordance with some embodiments of the present technology.

FIG. 5 is a schematic front view of a beverage robot 500 configured in accordance with some embodiments of the present technology. In the illustrated embodiment, the beverage robot 500 includes a housing 510 having an upper portion 512 and a lower portion 514 fluidly coupled to the upper portion 512. The upper portion 512 (sometimes also referred to as a "mixing portion," an "active blending portion," and/or the like) can include a dispensing head 520 positioned above a mixing driver 530 and a mixing container 532. The dispensing head 520 can include one or more nozzles 522 (three shown in the illustrated embodiment) that are positioned to dispense ingredients (e.g., concentrated juices, coffee, tea, syrups, water, sparkling water, and/or the like) into the mixing container 532. The mixing driver 530 can include a blender, shaker, emulsifier, and/or any other suitable component. The mixing container 532 can include a detachable container, an open container (e.g., an open cup), a closable container, and/or any other suitable component. As further illustrated in FIG. 5, the upper portion 512 can also include a cleansing system 540 adjacent to the mixing driver 530. The cleansing system 540 can include a glass rinser/washer that is configured to dispense water and/or a cleaning solution into the mixing container 532 and a draining component (e.g., a sink) to receive and carry used water and/or cleaning solution away from the mixing container 532. In some embodiments, the cleansing system 540 includes an automatic scrubber positioned to scrub the mixing container over the draining component.

During operation, the beverage robot 500 can dispense one or more ingredients through the dispensing head 520 and into the mixing container 532. The beverage robot 500 can then operate the mixing driver 530 to mix, blend, emulsify, and/or otherwise combine the ingredients in the mixing container 532. The beverage robot 500 can then repeat the process to dispense one or more additional ingredients and combine ingredients in the mixing container 532 according to a recipe for a current beverage. Additionally, or alternatively, the beverage robot 500 can dispense one or more ingredients to top the current beverage. A user of the beverage robot 500 (e.g., staff at a restaurant) can then pour the beverage out of the mixing container 532 into a container for the customer (e.g., a cup, disposable cup, bottle, carafe, bowl, and/or any other suitable container). Once empty, the user can position the mixing container 532 over the cleansing system 540 and operate the cleansing system 540 to clean and/or sanitize the mixing container 532. The user can then reset the mixing container 532 on the mixing driver 530 to prepare the beverage robot 500 for the next beverage.

As illustrated in FIG. 5, the lower portion (sometimes referred to as a "storage portion," a "refrigeration portion," and/or the like) can store one or more ingredient packages 550 (e.g., the BIB systems 430 discussed above with reference to FIG. 4). Each of the ingredient packages 550 can contain a concentrated ingredient that is used in one or more recipes that the beverage robot 500 can prepare. The ingredient packages 550 can be independently accessible and/or replaceable, allowing the user to swap packages as supply in any of the ingredient packages 550 runs low. In some embodiments, the lower portion 514 is refrigerated to keep the ingredient packages 550 at or below a predetermined temperature. In some embodiments, the lower portion 514 includes one or more sub-portions. A first sub-portion can be refrigerated to preserve perishable ingredients while a second sub-portion is not refrigerated (or heated) and stores non-perishable ingredients. The second sub-portion can be useful, for example, to store ingredients that become too viscous to adequately dispense when cooled.

As further illustrated in further illustrated in FIG. 5, each of the ingredient packages 550 can be fluidly coupled to the dispensing head 520 through vending lines 560. The vending lines 560 can include various components (e.g., valves, tubing connections, pumps, volumetric meters, pre-mixing components, and/or the like) to quickly provide ingredients to the dispensing head 520 with accurate volumetric amounts. In some embodiments, the vending lines 560 include a cleansing system configured to clean one or more of the tubing connections between beverages to reduce (or eliminate) cross-contamination. Further, in various embodiments, the lower portion 514 can be positioned directly beneath the upper portion 512 and/or can be separated from and fluidly coupled to the upper portion 512. In embodiments where the lower portion 514 is separated from the upper portion 512, the beverage robot 500 can include longer vending lines 560 and/or additional compression components to move ingredients between the lower portion 514 and the dispensing head 520.

Figure 6:
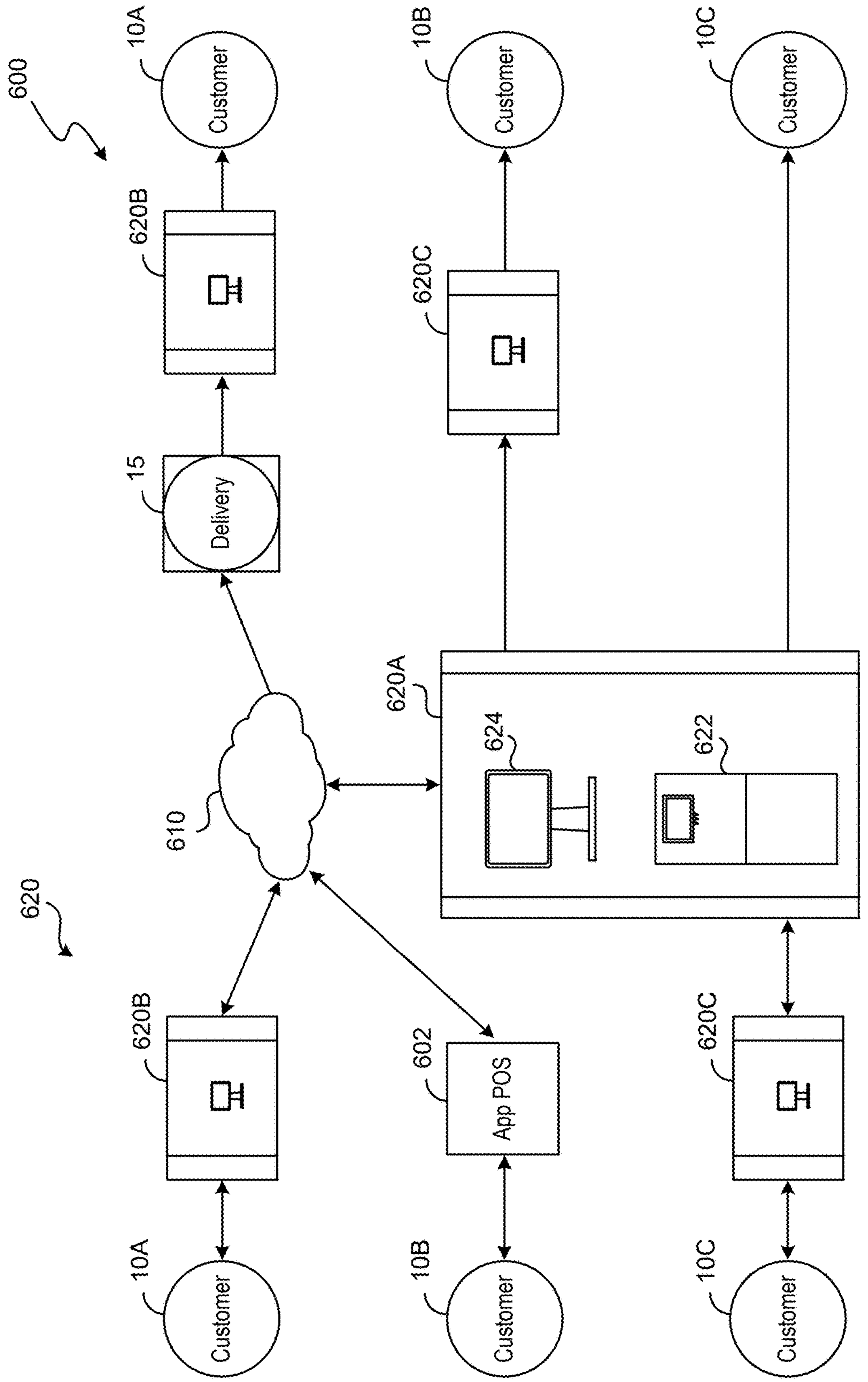
FIG. 6 is a schematic diagram of a mesh network with a plurality of vending locations configured in accordance with some embodiments of the present technology.

Specific Examples of Mesh Networks of Beverage Robots and Methods for Operating the Mesh Networks in Accordance With Embodiments of the Present Technology FIG. 6 is a schematic diagram of a mesh network 600 configured in accordance with some embodiments of the present technology. As discussed in more detail below, the mesh network 600 can allow, for example, a core vending location to prepare beverages (and/or other items) on behalf of peripheral vending locations, in turn allowing the peripheral vending locations to offer a wider variety of beverages on their menus. As a result, the mesh network 600 can help expand options for customers interacting with the mesh network 600 (e.g., expanding the available beverages throughout the mesh network 600, expanding the beverages available at their preferred vending location, and/or the like).

In the illustrated embodiment, the mesh network 600 includes a remote system 610 and a plurality of vending locations 620 (three illustrated in FIG. 6, referred to individually as "first-third vending locations 620A-620C," sometimes also referred to herein as "stores," "core" and "peripheral" vending locations, and/or the like). The remote system 610 can be generally similar (or identical) to the remote systems 110, 210 discussed above with reference to FIGS. 1 and 2. Further, the remote system 610 can include one or more server computing devices that implement an operating platform generally similar (or identical) to the platform 300 discussed above with reference to FIG. 3 to help manage, control, and/or direct operations at each of the vending locations 620.

Similarly, one or more of the vending locations 620 can each be generally similar (or identical) to the vending locations 120, 220 discussed above with reference to FIGS. 1 and 2. For example, as illustrated in FIG. 6, the first vending location 620A (sometimes also referred to herein as a "core vending location") can each include one or more beverage robots 622 (one illustrated in FIG. 6) and a POS system 624 communicably coupled to the beverage robot(s) 622. Further, each of the beverage robot(s) 622 can include a subsystem generally similar (or identical) to the subsystem 400 discussed above with reference to FIG. 4. However, one or more of the vending locations 620, such as the second and third vending locations 620B, 620C do not include a beverage robot. Instead, the remote system 610 can be communicably operably coupled between the first vending location 620A and the second and third vending locations 620B, 620C (sometimes also referred to herein as "peripheral vending locations") to communicate recipes, orders, delivery information, and/or pick-up information therebetween and/or to help manage orders throughout the mesh network 600.

FIG. 6 illustrates various specific examples of orders received at and produced by the mesh network 600. More specifically, FIG. 6 illustrates three customers (referred to individually as first-third customers 10A-10C) that interact with the mesh network 600 to order beverages from various different menus and ultimately receive the beverages from the first vending location 620A.

For example, the first customer 10A can view a menu in-person at the second vending location 620B and submit an order directly to the second vending location 620B (e.g., to a POS system at the second vending location 620B). The second vending location 620B can then communicate the order to the remote system 610. As discussed in more detail below with respect to FIGS. 7-11, the remote system 610 can confirm the first vending location 620A has the ingredients necessary to prepare the beverage(s), determine a delivery method and a pick-up time, and schedule the beverage(s) to be prepared by the beverage robot(s) 622 at the first vending location 620A.

Determining the delivery method can include determining whether personnel from the second vending location 620B will pick up the order from the first vending location 620A, whether personnel from the first vending location 620A will deliver the order to the second vending location 620B, whether a third-party deliver person will transport the order from the first vending location 620A to the second vending location 620B, whether the first customer 10A will receive the order directly from the first vending location 620A, and/or the like. The determination can be based on information received with the order (e.g., a selection from the first customer 10A), an existing relationship between the first and second vending locations 620A, 620B, a check of available personnel, and/or the like. Further, determining the pick-up time can include estimating an arrival time for a delivery person and/or the first customer 10A, checking for a requested pick-up time (e.g., a scheduled pick-up), estimating a completion time for the order based on a queue at each of the beverage robot(s) 622 at the first vending location 620A, estimating a reception time for one or more other items in the order (e.g., food items being prepared by the second vending location 620B), and/or the like.

In the illustrated embodiment, for example, the first customer 10A can elect to have a delivery person 15 transport the beverage(s) in the order from the first vending location 620A to the second vending location 620B and to receive the order from the second vending location 620B. Accordingly, as discussed in more detail below, the remote system 610 can estimate when the delivery person 15 will arrive at the second vending location 620B and schedule the beverage(s) in the order to be prepared by the beverage robot(s) 622 closer to the time of arrival. As a result, the beverage(s) in the order can be fresher when picked up (and delivered) than if the remote system 610 instructed the beverage robot(s) 622 to prepare the beverage(s) right away.

Further, each of the vending locations 620 can have customized recipes for the beverages on their menu (e.g., recipes specific to each individual vending location). Purely by way of example, the first vending location 620A can have a first recipe for lemonade that includes 10% lemon juice concentrate, 10% simple syrup concentrate, 10% carbonated water, 30% regular water, and 40% ice; the second vending location 620B can have a second recipe for lemonade that includes 10% lemon juice concentrate, 5% simple syrup concentrate, 45% regular water, and 40% ice; and the third vending location 620C can have a third recipe for lemonade that includes 10% lemon juice concentrate, 5% simple syrup concentrate, 5% strawberry juice concentrate, 50% regular water, and 30% ice. As a result, the lemonade from the first-third vending locations 620A-620C will taste differently when prepared by the beverage robots 622 according to the recipe at the first-third vending locations 620A-620C. Thus, for example, if the beverage robot(s) 622 at the first vending location 620A prepares the beverage(s) in the order according to the recipe(s) at the first vending location 620A, the beverage(s) may taste different from expectations from the first customer 10A when they submitted the order.

To address this issue, the remote system 610 can store (or retrieve) the recipes for each of the beverages offered by the vending locations 620 and send the relevant recipe to the first vending location 620A when assigning the beverage(s) in the order. For example, before the remote system 610 sends the order from the first customer 10A to the first vending location 620A, the remote system 610 can retrieve the recipe(s) for each of the beverage(s) in the order specific to the second vending location 620B, check for any adjustments to the recipe (e.g., based on customizations in the order), and send the recipe(s) to the first vending location 620A. As a result, the beverage robot(s) 622 in the first vending location 620A can prepare the beverage(s) with a flavor profile in line with the customer's expectations when they submit the order at the second vending location 620B. Further, because the beverage(s) are prepared by the beverage robot(s) 622, the mesh network 600 does not require staff at each of the first vending location 620A to be trained to prepare all of the beverage offerings in the mesh network 600 and/or follow recipe directions to create the beverages. As a result, for example, the mesh network 600 can enable each of the vending locations 620 to offer a variety of different beverages (and/or different recipes for the beverages) while preparing the different beverages with consistent flavor profiles and other qualities. That is, the mesh network 600 can expand the beverage options available to customers at their preferred vending locations.

In another example, as further illustrated in FIG. 6, the second customer 10B can access the menu at the third vending location 620C through an App-based POS 602 that is communicatively coupled to the remote system 610 (and/or any of the vending locations 620). The App-based POS 602 can be a smartphone (or other smart device) app specific to any of the vending locations 620, an app hosted by the remote system 610, and/or a third-party app (e.g., Google®, Square®, DoorDash®, Grubhub®, Uber Eats®, Seamless®, Postmates®, and/or the like). When the second customer 10B submits an order for one or more beverages, the App-based POS 602 can send the order to the remote system 610. The remote system 610 can then assign portions of the order to any of the vending locations 620 relevant to the order (e.g., assigning beverages in the order to the first vending location 620A while assigning food items in the order to the third vending location 620C).

Similar to the discussion above, once the remote system 610 receives the order from the second customer 10B, the remote system 610 can retrieve a recipe for each of the beverage(s) in the order specific to the third vending location 620C, check for any adjustments to the recipe, confirm the first vending location 620A has the ingredients necessary to prepare the beverage(s), determine a delivery method and a pick-up time, and schedule the beverage(s) to be prepared by the beverage robot(s) 622 at the first vending location 620A. In the illustrated embodiment, for example, the remote system 610 determines that the beverage(s) will be transported directly between the first and third vending locations 620A, 620C (e.g., by personnel at the first vending location 620A, personnel at the third vending location 620C, and/or the like) and received by the second customer 10B at the third vending location 620C.

In yet another example illustrated in FIG. 6, the third customer 10C can view a menu in-person at the third vending location 620C and submit an order directly to the third vending location 620C (e.g., to a POS system at the third vending location 620C). In turn, the third vending location 620C can communicate the order to the remote system 610. Similar to the discussion above, once the remote system 610 receives the order from the second customer 10B, the remote system 610 can retrieve a recipe for each of the beverage(s) in the order specific to the third vending location 620C, check for any adjustments to the recipe, confirm the first vending location 620A has the ingredients necessary to prepare the beverage(s), determine a delivery method and a pick-up time, and schedule the beverage(s) to be prepared by the beverage robot(s) 622 at the first vending location 620A.

In the illustrated embodiment, for example, the remote system 610 determines that the beverage(s) will be received by the third customer directly from the first vending location 620A. Accordingly, the remote system 610 can estimate an arrival time for the third customer 10C at the first vending location 620A and schedule the order to be produced close to the arrival time. As a result, the beverage(s) in the order can be fresher than if they were prepared immediately after the remote system 610 received the order.

One of skill in the art will understand that the examples for receiving and producing orders are not limited to the three specific examples discussed above. Purely by way of example, another customer can interact with the POS system 624 at the first vending location 620A and receive their order directly from the first vending location 620A. In this example, the order can be received and assigned to one or more of the beverage robots 622 entirely within an ecosystem at the first vending location 620A and/or communicated to the remote system 610 for processing. In another example, a customer can interact with the App-based POS 602 to order a beverage from the third vending location 620C, the delivery person 15 can transport the beverage from the first vending location 620A to the third vending location 620C, and the customer can receive the beverage from the third vending location 620C. In yet another example, a customer can interact with a web-based POS (e.g., a website coupled to (or hosted by) the remote system 610, a third-party ordering platform (e.g., Google®, Square®, DoorDash®, Grubhub®, Uber Eats®, Seamless®, Postmates®, and/or the like), and/or the like) to order from any of the vending locations 620 and then receive the beverage(s) in the order from any of the vending locations 620.

Figure 7:
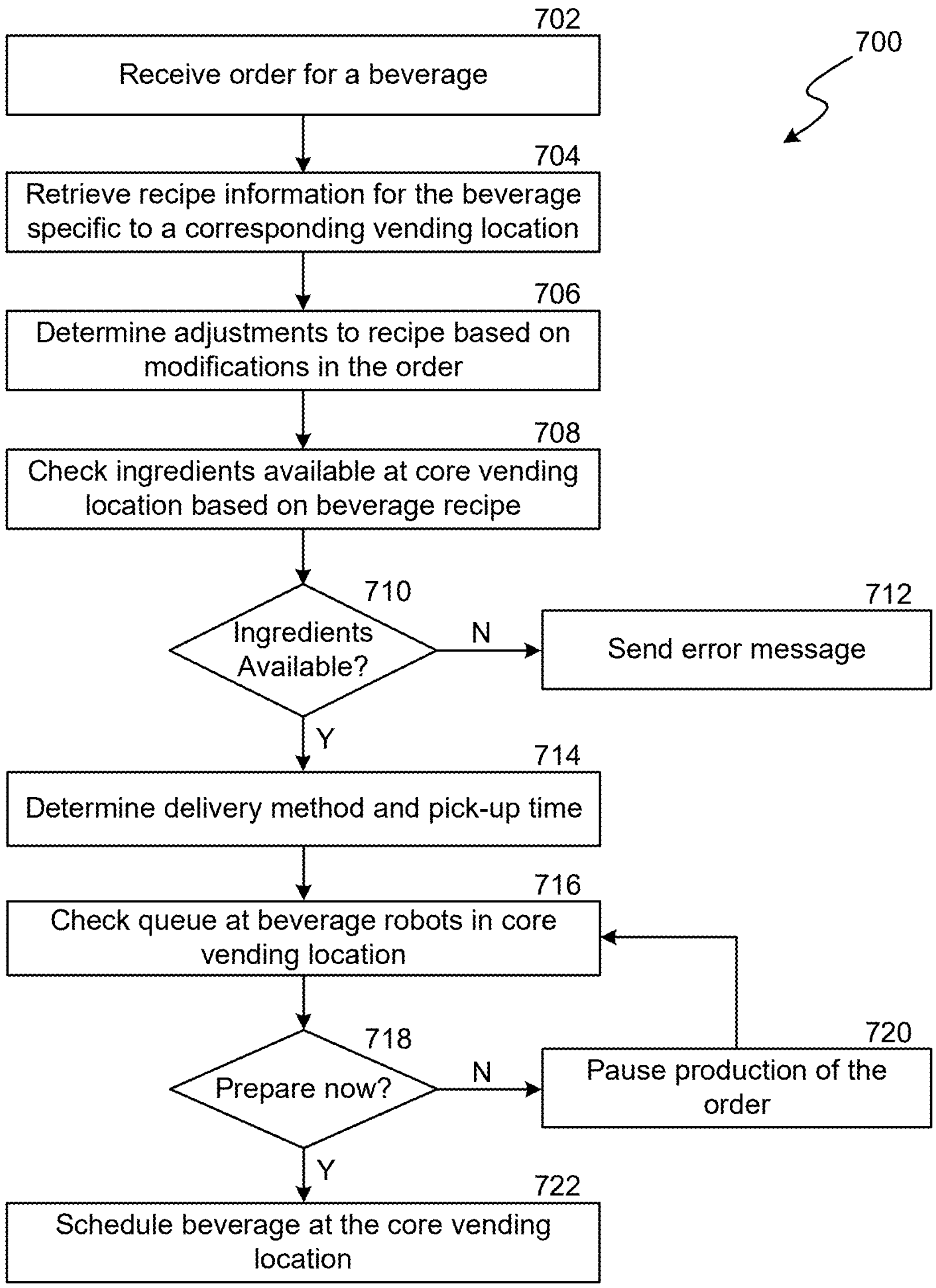
FIG. 7 is a flow diagram of a process for operating a mesh network with a plurality of vending locations in accordance with some embodiments of the present technology.

FIG. 7 is a flow diagram of a process 700 for operating a mesh network with a plurality of beverage robots in accordance with some embodiments of the present technology. The mesh network can be generally similar to the mesh network 600 discussed above with reference to FIG. 6. Further, it will be understood that the process 700 can be executed by any suitable computing devices in the mesh network. For example, the process 700 can be executed by a computing device housing the platform 300 discussed above with reference to FIG. 3; the subsystem 400 discussed above with reference to FIG. 4; the remote system 610, POS system 624, and/or the beverage robot 622 discussed above with reference to FIG. 6; and/or the like. Additionally, or alternatively, although discussed herein in the context of being executed entirely within a single component (e.g., entirely within the remote system 610 of FIG. 6), it will be understood that one or more steps in the process 700 can be executed by a different computing device than one or more other steps.

As illustrated in FIG. 7, the process 700 can begin at block 702 by receiving an order for a beverage (e.g., at the remote system, at a core vending location, and/or the like). As discussed above, the order can be received from a variety of sources, such as a POS system in a vending location, various app-based platforms, various web-based platforms, and/or any other suitable system. In some embodiments, the order is received at a remote system directly from the customer associated with the order. In some embodiments, the order is received at the remote system from another platform (e.g., from a core vending location (e.g., the first vending location 620A of FIG. 6), a peripheral vending location (e.g., the second and third vending locations 620B, 620C of FIG. 6), from a third-party ordering platform, and/or the like). The order can include an indication of the beverage in the order along with various other information related to the order. For example, the order can include one or more modifications to the beverage (e.g., customizations to add/reduce/remove ice and/or any ingredients). In another example, the order can include the time-related parameters (e.g., a requested pick-up time, information on one or more other items in the order (e.g., food items being prepared by a peripheral vending location), a selected delivery window, and/or the like). In yet another example, the order can include an indication of a delivery method (e.g., customer pick-up, delivery person pick-up, delivery from the core vending location to the peripheral vending location, automated delivery, and/or the like).

At block 704, the process 700 includes retrieving a recipe for the beverage. The recipe can be specific to (customized, offered only at, and/or the like) a vending location corresponding to the order (e.g., from a menu at the second vending location 620B of FIG. 6). In various embodiments, the recipe can be retrieved from one or more databases at the remote system (e.g., storing each recipe used in the mesh network), retrieved from the corresponding vending location (e.g., by querying the POS system in the corresponding vending location), retrieved from the information received with the order, and/or the like. The recipe can allow the process 700 to compile a list of ingredients necessary to prepare the beverage. Further, because the recipe can be specific to the corresponding vending location, the recipe can allow the beverage robots at a core vending location to produce the beverage with flavor profiles consistent with the customer's expectations when submitting the order at the peripheral vending location (e.g., using a lemonade recipe specific to the peripheral vending location rather than a generic lemonade recipe and/or a lemonade recipe specific to the core vending location).

At block 706, the process 700 includes determining one or more adjustments to the recipe based on modifications in the order. As discussed above, the modifications can add, reduce, and/or remove various ingredients from the beverage. For example, the modifications can be for extra (or less) ice, sugar (and/or any other sweetener), carbonation, and/or the like. In another example, the modifications can include changes to ratios of ingredients (e.g., extra of one or more ingredients, less of one or more ingredients, and/or the like), additions of one or more ingredients (e.g., adding a juice concentrate), and/or subtractions of one or more ingredients (removing an ingredient, removing ice, and/or the like). Additionally, or alternatively, the modifications can include swapping temperature profiles for the beverage (e.g., selecting to have a hot beverage (e.g., a latte) iced; selecting to have an iced beverage hot; and/or the like). The process 700 can use the modifications from the order to adjust the recipe retrieved at block 704 in view of the requested customizations. Similar to the discussion above, the resulting recipe can allow the process 700 to compile a list of ingredients necessary to prepare the beverage, as customized. Further, the resulting recipe can allow the beverage robots at a core vending location to produce the beverage with flavor profiles consistent with the customer's expectations when submitting the order.

At block 708, the process 700 includes checking the ingredients available at the core vending location based on the recipe resulting from block 706 (or directly from block 704 when there are no modifications). The check at block 708 can confirm that one or more beverage robots at the core vending location are available to prepare the beverage based on the recipe. To be available to produce the beverage, the beverage robot must have access to the ingredients required for the beverage (e.g., the beverage robot 500 of FIG. 5 must have ingredient packages 550 corresponding to each of the ingredients in the recipe and/or other access to each of the ingredients in the recipe (e.g., via a supply line shared between beverage robots)). As a result, for example, the core vending location can be unable to prepare the beverage despite having all of the ingredients in the list if the ingredients for the beverage are split between beverage robots at the core vending location. Similar to the retrieval of the recipes, the check can include retrieving the information from one or more databases at the remote system and/or querying the core vending location (e.g., querying the beverage robot(s) at the core vending location) for the information.

At decision block 710, if the ingredients for the beverage are not available at a beverage robot in the core vending location, the process 700 continues to block 712 to send an error message to a source of the order (e.g., to a peripheral vending location, an app-based POS system, a web-based POS system, and/or the like). The error message can prompt the source to identify the error to the customer associated with the order, allowing the customer to select a different beverage and/or be refunded for the beverage. Additionally, or alternatively, the error message can include information related to adjusting the menu at the source of the order. For example, the error message can identify one or more beverages on the menu at a peripheral vending location that are unavailable (e.g., based on an ingredient being out and/or replaced at the core vending location, one or more beverage robots undergoing maintenance at the core vending location, and/or the like). In another example, the error message can include information related to which ingredients are not available at the core restaurant, allowing the source of the order to adjust the menu displayed to customers.

Conversely, if the ingredients for the beverage are available at decision block 710, the process 700 moves to block 714. At block 714, the process 700 includes determining a delivery method and pick-up time for the beverage. In some embodiments, the process 700 determines the delivery method and/or pick-up time at least partially based on the information received with the order, such as a requested pick-up time and/or a selected delivery method (e.g., customer pick-up). Additionally, or alternatively, the process 700 can determine the delivery method and/or pick-up time at least partially based on known relationships between the core vending location and the peripheral vending location (e.g., recurring pick-ups at the core vending location from the peripheral vending location, recurring deliveries from the core vending location to the peripheral vending location, a known travel time between the core vending location and the peripheral vending location, and/or the like). Additionally, or alternatively, the process 700 can determine the delivery method and/or pick-up time at least partially based on other items in the order (e.g., an estimated completion time for food items in the order).

At block 716, the process 700 includes checking a queue at the beverage robots at the core vending location. The queue can include the number of beverages already assigned to each of the beverage robots to be prepared by each of the beverage robots. Additionally, or alternatively the queue can include information about the orders associated with the queues, information about the individual beverages in the queue, required downtime at the beverage robots (e.g., for cleaning, maintenance, and/or ingredient replacement), and/or the like. In various embodiments, checking the queue(s) can include accessing a database at the remote server (e.g., storing an updated queue for each of the beverage robots), querying another database for the queue(s) (e.g., a server at the core vending location), and/or querying one or more of the beverage robots at the core vending location.

The queue can be indicative of when the beverage robots will be able to prepare the beverage in the order. Purely by way of example, the queue can indicate a estimated completion time based on an average preparation time per beverage (e.g., 20 seconds per beverage, 30 seconds per beverage, 40 seconds per beverage, 1 minute per beverage, and/or the like), planned down time for maintenance and/or cleaning, and/or preparation times specific to the beverages in the queue.

At decision block 718, the process 700 decides whether to prepare the beverage now. When the process 700 determines not to prepare the beverage now, the process 700 can proceed to block 720; else the process 700 can proceed to block 722. The process 700 at decision block 718 can be based on the delivery method and/or pick-up time determined at block 714, the queue at the beverage robots from block 716, and/or any other suitable parameters. Purely by way of example, the process 700 at decision block 718 can include checking whether the completion time for the beverage is in sync with a pick-up time for the order and, if not, proceeding to block 720.

At block 720, the process 700 includes pausing production of the order. For example, the process 700 at block 720 can pause the production of the order for a predetermined amount of time (e.g., 30 seconds, 1 minute, 5 minutes, 10 minutes, 30 minutes, and/or any other suitable amount of time). In another example, the process 700 can pause the production of the order until closer to the estimated pick-up time, the estimated completion time for other item(s) in the order, and/or the like. In yet another example, the process 700 can pause the production of the order until a condition to resume is received (e.g., a determination that the user is within a predetermined distance and/or travel time from the vending location, an indication that other item(s) in the order are complete, and/or the like). In the illustrated embodiment, after the pause, the process 700 returns to block 716 to check the queue at the beverage robots at the core vending location again, then to decision block 718 to decide whether to produce the beverage. In various other embodiments, however, the process can return to block 714 (e.g., to confirm a pick-up time based on a status of other items in the order, a location of the customer, a location of a delivery person, and/or the like) and/or proceed directly to block 722 after the pause.

At block 722, the process 700 includes scheduling the beverage at the core vending location. Scheduling the beverage can include identifying which beverage robots at the core vending location are available to produce the beverage, deciding which beverage robot to assign the beverage to when there are multiple eligible robots, and assigning the beverage to a chosen robot. The assignment can cause the chosen robot to add the beverage to the queue at the chosen robot and, as a result, prepare the beverage in the order while processing the queue. Additionally, or alternatively, scheduling the beverage can include updating a database with a status tracking the order (e.g., to confirm the beverage has been assigned to a beverage robot, to show the beverage's position in the queue, and/or the like). Additionally, or alternatively, scheduling the beverage can include assigning the beverage to a delivery person in the mesh network (e.g., staff at the core vending location and/or the peripheral vending location) and/or sending a message to a user device associated with the order (e.g., a third-party delivery person, the customer associated with the order, and/or the like). That is, scheduling the beverage at the core vending location can include scheduling a delivery and/or pick-up for the beverage.

Although the blocks 702-722 of the process 700 are discussed and illustrated in a particular order, the process 700 illustrated in FIG. 7 is not so limited. For example, the process 700 can be performed in a different order. In these and other embodiments, any of the blocks 702-722 of the process 700 can be performed before, during, and/or after any of the other blocks 702-722 of the process 700. In a specific, non-limiting example, all or a subset of the blocks 704-710 can be executed at a same timing as all or a subset of blocks 714-716. In another specific, non-limiting example, all or a subset of block 716 can be performed before (or at the same time as) executing all or a subset of block 714. Moreover, a person of ordinary skill in the relevant art will recognize that the illustrated process 700 can be altered and still remain within these and other embodiments of the present technology. For example, the process 700 can be modified to handle orders with a plurality of beverages, each of which can have a different recipe and/or different customizations associated with the beverage. In another example, one or more blocks 702-722 of the process 700 illustrated in FIG. 7 can be omitted and/or repeated any suitable number of times. In a specific, non-limiting example, all or a subset of blocks 706-710 can be omitted such that the process 700 skips the check to confirm the ingredients are available (e.g., in embodiments where a menu at each vending location is dynamically updated to only offer beverages (and modifications to beverages) with available ingredients). Additionally, or alternatively, the process 700 can be modified in view of any of the processes discussed below with reference to FIGS. 8-11. In a specific, non-limiting example, the process 700 can be modified to include the process 800 of FIG. 8 at (or before) block 722 to identify a specific beverage robot for each beverage in the order. In another specific, non-limiting example, blocks 714-722 the process 700 can be modified by the process 900 of FIG. 9 and/or the process 1000 of FIG. 10 to help synchronize the production of the order with a pick-up time for the order and/or various other items in the order (e.g., food items).

Figure 8:
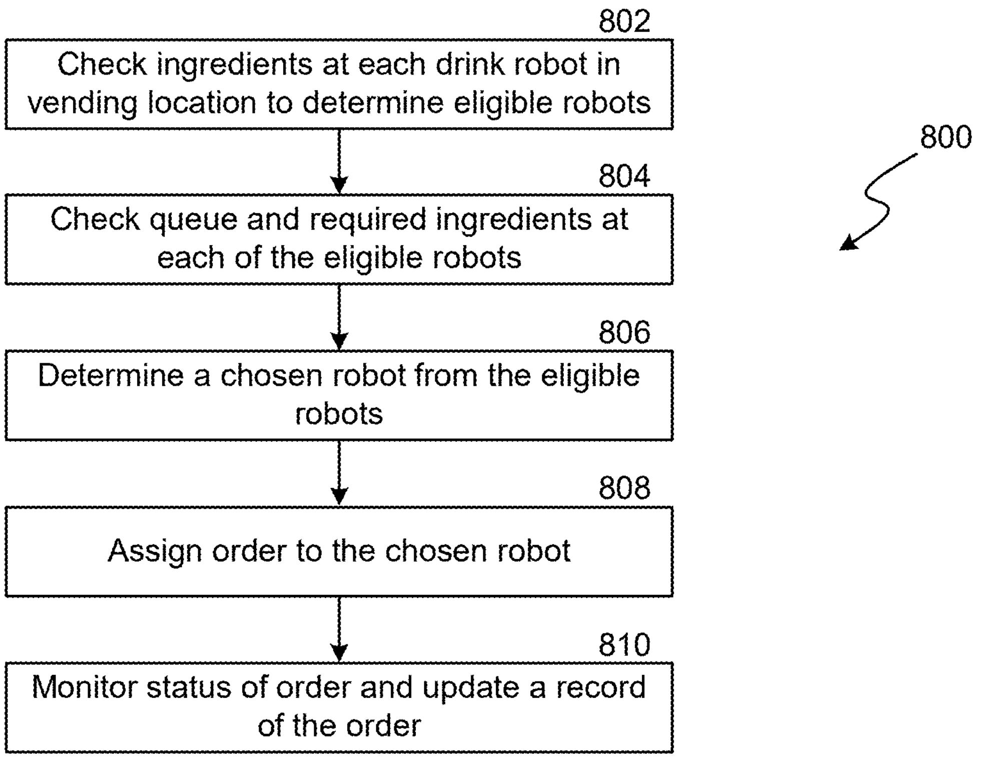
FIG. 8 is a flow diagram of a process for operating beverage robots at a vending location in accordance with some embodiments of the present technology.

FIG. 8 is a flow diagram of a process 800 for operating beverage robots at a core vending location in accordance with some embodiments of the present technology. More specifically, for example, the process 800 can be executed in response to receiving an order for one or more beverages (e.g., at block 702 of FIG. 7) and/or in response to a determination to schedule the one or more beverages (e.g., at block 722 of FIG. 7). Similar to the process discussed above with reference to FIG. 7, the process 800 can be executed by any suitable computing device (or combination of computing devices) in a mesh network of the type discussed above. Purely by way of example, the process 800 (or any suitable portion thereof) can be executed by a computing device housing the platform 300 discussed above with reference to FIG. 3; the subsystem 400 discussed above with reference to FIG. 4; and/or any of the components of the mesh network 600 discussed above with reference to FIG. 6.

At block 802, the process 800 includes checking the ingredients available at each beverage robot in the core vending location to determine a list of eligible robot(s) available to help produce the order. To be available to help produce the order, a beverage robot must have the ingredients required to prepare one or more of the beverage(s) in the order. Purely by way of example, a first beverage robot would not be available to prepare a beverage requiring ingredients A-C if the beverage robot had only ingredients A, B, D, and E. In contrast, a second beverage robot with ingredients A-G would be available to prepare the beverage. Accordingly, the check at block 802 can include identifying the ingredients required for each beverage in the order (e.g., based on a recipe for each beverage and/or any modifications in the order). Identifying the required ingredients can include retrieving a list of recipes from a central database (e.g., a storage device in the remote system), another database (e.g., querying a POS system at a vending location associated with the order) for the recipes, and/or any other suitable location. Similarly, checking the ingredients available at each of the beverage robot(s) at the core vending location can include retrieving a list of ingredients available (e.g., in stock, stored, etc.) at each beverage robot from the central database, retrieving the list from another database, querying each of the beverage robots in the core vending location, and/or the like. The process 800 at block 802 can then review the ingredients available at each of the beverage robots to identify eligible robots that are available to prepare at least one beverage (or all beverages) in the order.

At block 804 the process 800 includes checking a queue at each of the eligible robots (e.g., each of the robots identified as available in block 802). The queue can include the number of beverages already assigned to each of the eligible robots to be prepared by each of the individual eligible robots. Additionally, or alternatively, the queue can include information about the beverages in the queue (e.g., a priority of the beverages, desired completion times for the beverages, information about the orders related to the beverages, and/or the like), required and/or scheduled downtime at the eligible robots (e.g., for cleaning, maintenance, and/or ingredient replacement), and/or the like. Similar to the discussion above, checking the queue(s) can include accessing a central database with current information on the queue(s), querying another database for the queue(s), and/or querying each of the beverage robots in the core vending location.

At block 806, the process 800 includes determining one or more chosen robots from the eligible robots to produce the order (or prepare any suitable subset of the beverages in the order). The determination of the chosen robot can be based on which of the eligible robots can prepare one or more of the beverage(s) in the order fastest. For example, the determination can identify the eligible robots with the shortest queue(s) and assign one or more of the beverages from the order to the identified robots. Additionally, or alternatively, the determination can be based on the timing-related parameters associated with the orders. For example, the process 800 can choose an eligible robot with a longer queue to intentionally delay the production of the order (e.g., closer to an estimated pick-up time from a customer, delivery person, an/or the like; closer to a completion time for other items in the order; and/or the like). As a result, the order can be fresher when it is actually picked up and/or when other items in the order are complete. Further, scheduling the order with an intentional delay can help keep eligible robots with shorter queues available for high-priority orders (e.g., orders with a fast pick-up time), which can help increase throughput and customer satisfaction, and can help manage traffic in the core vending location. In another example, the process 800 can determine the chosen robot(s) based on which of the eligible robots will be least impacted by promoting an order associated with a high priority (e.g., replacing an incorrect order) to the top of the queue.

At block 808, the process 800 includes assigning the order (or any suitable subset of the beverages in the order) to each of the chosen robot(s). As a result, each of the chosen robot(s) can add the beverage(s) in the assignment to the corresponding queue and prepare the assigned beverages after preparing any beverages that were already in the queue ahead of the beverage(s). The assignment at block 808 can include sending (e.g., transmitting) the order (or any suitable subset of the order) to the chosen robot. Additionally, the assignment can include sending an indication of the assignment to any other suitable destination. For example, the assignment at block 808 can include updating one or more databases in the remote system to update the queue corresponding to the chosen robot(s). In another example, the assignment at block 808 can include sending the assignment to a POS system associated with originating the order (e.g., a POS system in any of the vending locations, an App-based POS, a web based POS, and/or the like) to make the assignment visible to the customer. In some embodiments, the assignment at block 808 places the order (or any suitable subset of the order) at the back of the queue at the chosen robot(s). In some embodiments, the assignment at block 808 places the order higher on the queue at the chosen robot(s) (e.g., to expedite an order with a high priority). In a specific, non-limiting example, an order identified as replacing an incorrect order can be placed at the front of the queue at the chosen robot(s) by the assignment at block 808.

At block 810, the process includes monitoring a status of the order and updating a record of the order. The status can include how many beverages are ahead of the beverage(s) in the order at each of the chosen robot(s), an estimated time of completion for the order based on the queues at each of the chosen robot(s), and/or the like. The record of the order can be within a database at the remote system, the POS system associated with originating the order, and/or any other suitable location. Further, the record can be accessible (e.g., through the POS system, an app, a web browser, and/or the like) and/or otherwise visible to customers and/or other users (e.g., delivery drivers, vending location personnel, and/or the like). The process 800 can monitor the status of the order and update the record of the order at block 810 periodically (or continuously) until the beverage(s) in the order are prepared and/or until the order is picked up at the core vending location. Once the beverage(s) in the order are prepared and/or the order is picked up, the process 800 can record the completed status in the record and stop monitoring the order.

Although the blocks 802-810 of the process 800 are discussed and illustrated in a particular order, the process 800 illustrated in FIG. 8 is not so limited. For example, various steps of the process 800 can be performed in a different order and/or omitted. In these and other embodiments, any of the blocks 802-810 of the process 800 can be performed before, during, and/or after any of the other blocks 802-810 of the process 800. Purely by way of example, in some embodiments, the process 800 omits all of, or a portion of, block 810 to complete after assigning an order to a chosen robot and updating a cloud database on the assignment. Moreover, a person of ordinary skill in the relevant art will recognize that the illustrated process 800 can be altered and still remain within these and other embodiments of the present technology.

Figure 9:
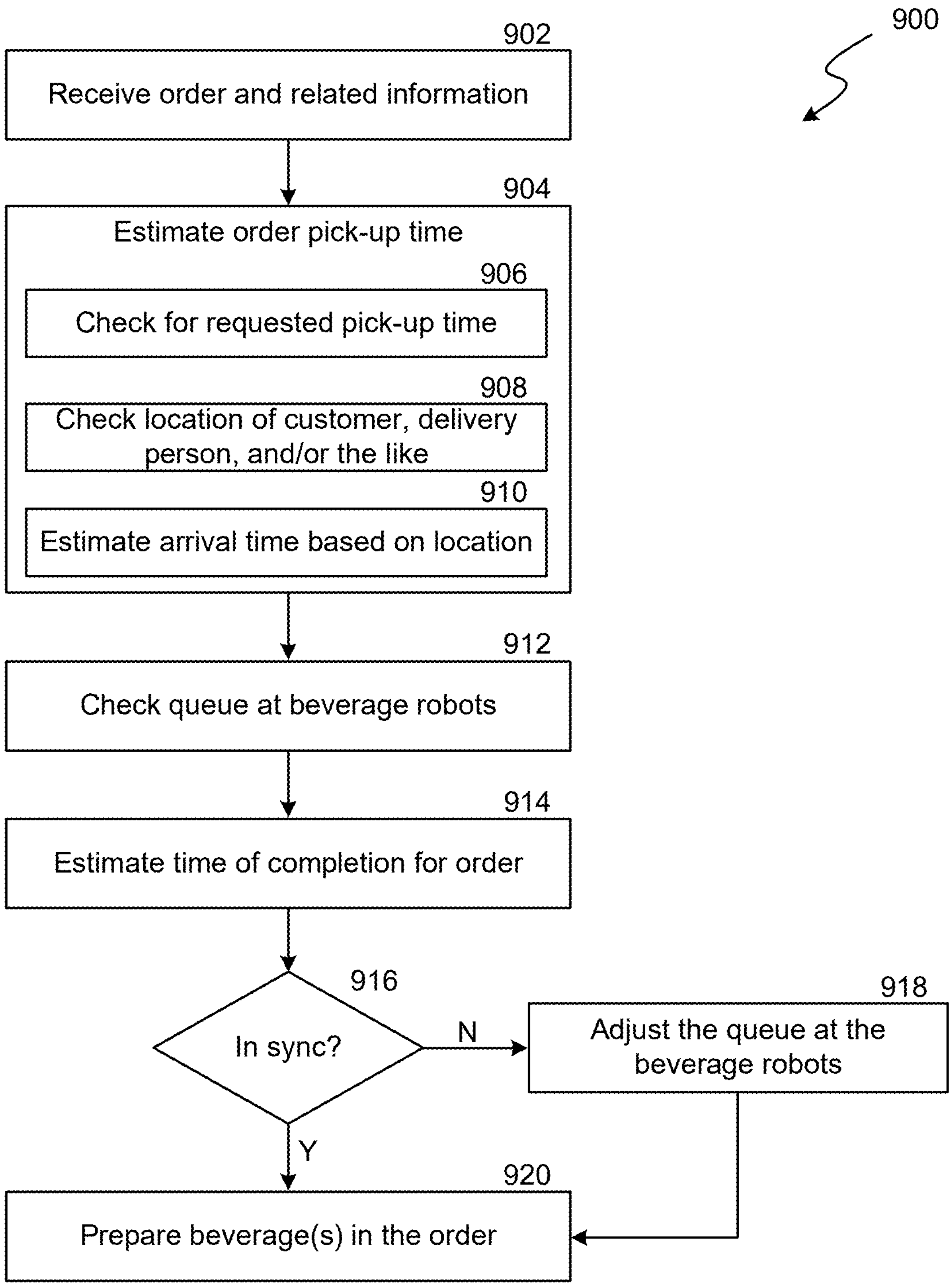
FIG. 9 is a flow diagram of a process for managing a queue at a vending location in accordance with some embodiments of the present technology.

FIG. 9 is a flow diagram of a process 900 for managing a queue at a core vending location of a mesh network in accordance with some embodiments of the present technology. More specifically, for example, the process 900 can be executed to help synchronize the completion of the beverages in an order with a pick-up time for the order. As a result, the process 900 can help improve a freshness of the beverages when they are picked up and/or received by a customer, improving customer satisfaction when interacting with the mesh network. Similar to the processes discussed above with reference to FIGS. 7 and 8, the process 900 can be executed by any suitable computing device (or combination of computing devices) in a mesh network of the type discussed above. Purely by way of example, the process 900 (or any suitable portion thereof) can be executed by a computing device housing the platform 300 discussed above with reference to FIG. 3; the subsystem 400 discussed above with reference to FIG. 4; and/or any of the components of the mesh network 600 discussed above with reference to FIG. 6. Further, the process 900 can be implemented in response to any suitable step of the processes discussed above and/or in response to any other suitable trigger. Purely by way of example, the process 900 can be executed as a part of (or after) scheduling the beverage(s) of an order at block 722 of FIG. 7. Further, although discussed herein in the context of being executed entirely within a single component (e.g., entirely within the remote system 610 of FIG. 6, within one of the beverage robots at the core vending location, and/or the like), it will be understood that a first subset of the process 900 can be executed by a different computing device than a second subset of the process 900.

The process 900 can begin at block 902 by receiving an order for one or more beverages and information related to the order. Purely by way of example, block 902 of the process 900 can be triggered at block 702 of FIG. 7 after receiving the order, at block 722 of FIG. 7 when scheduling the order, and/or after block 722 to help synchronize orders with other events during their production (e.g., as a part of block 810 of FIG. 8). The information related to the order can include timing-related information (e.g., a requested pick-up time, a request for immediate preparation, and/or the like), geographic information (e.g., GPS signals from a user device associated with the customer, a delivery person, and/or the like), information on other items in the order (e.g., estimated completion times for food items and/or the like), a priority for the order, and/or the like.

At block 904, the process 900 includes estimating an order pick-up time. Estimating the order pick-up time at block 904 can be based on a variety of factors related to the order. For example, at subblock 906, the process 900 includes checking for a requested pick-up time in the order (e.g., pick-up in 1 hour, pick-up at 2:30 PM, and/or the like). When the order includes a requested pick-up time, the process 900 can use the requested pick-up time as the estimated order pick-up time and/or an initial estimate that is refined by additional timing-related information (e.g., to match the estimated pick-up time with the actual arrival time of the customer). In some embodiments, the requested pick-up time is associated with a recurring pick-up time. For example, a peripheral vending location can pick-up orders from the core vending location every 5 minutes, 10 minutes, 15 minutes, and/or any other suitable time and the requested pick-up time can be the next recurring pick-up time.

At optional subblock 908, the process 900 includes checking a location of the customer and/or the delivery person associated with the order. For example, the process 900 can receive geographic information (e.g., GPS information) from a user device associated with the order, such as a smartphone associated with the customer. As discussed above, the geographic information can be received with the order (e.g., shared by the user device when submitting a mobile order). Additionally, or alternatively, the geographic information can be received continuously (or periodically) after receiving the order (e.g., from an app on the smartphone), as part of an assignment of the order to a delivery person, and/or the like. The geographic information can include GPS data indicating the location of the user device, information on how the associated user is traveling (e.g., walking, biking, driving, riding transit, and/or the like), and/or any information on a planned route to the core vending location (e.g., including any stops a delivery person will make on the way).

At optional subblock 910, the process 900 includes estimating an arrival time based on the geographic information. The process 900 can then use the estimated arrival time as the estimated pick-up time for the order. Determining the estimated arrival time can include generating a route between the location of the user device and the core vending location based on various modes of travel, determining traffic information, and estimating travel time on the route. Additionally, or alternatively, determining the estimated travel time can include referencing average travel times along the route between the user device and the core vending location.

At block 912, the process 900 includes checking a queue of orders at the beverage robots at the core vending location. As discussed above, checking the queue at the beverage robots can include accessing a central database (e.g., at the remote system), querying another database for the queue (e.g., the POS system at the core vending location and/or the like), and/or querying the beverage robots at the core vending location for their current queue.

At block 914, the process 900 includes estimating a time of completion for each beverage in the order (and/or the order overall) based on the queue information from block 912. The estimated completion time can be based on an estimated preparation time for each of the beverages in the queue(s) plus an estimated preparation time for the beverage(s) in the order. In some embodiments, the estimated preparation time is based on an average preparation time per beverage. In some embodiments, the estimated preparation time is based on preparation times specific to the beverages in the queue(s).

At decision block 916, if the estimated completion time is generally in sync with the estimated pick-up time (e.g., the requested pick-up time, the estimated time of arrival, and/or the like), the process 900 continues to block 920 to prepare the beverage(s) in the order based on their current position in the queue. In various embodiments, for the process 900 to consider the estimated completion time to be generally in sync with the estimated arrival time, the estimated completion time must be within 1 minute, within 2 minutes, within 5 minutes, within 10 minutes, within 15 minutes, and/or within any other suitable period of the estimated pick-up time.

Conversely, if the estimated completion time is not generally in sync with the estimated arrival time, the process 900 continues to block 918 to adjust the queue at the beverage robot(s). In some embodiments, the adjustment at block 918 pauses the production of the order (e.g., by moving the beverages back in the queue and/or taking the beverages out of the queue for a period of time) to help improve the synchronization between the completion time of the order and the order pick-up time when the estimated completion time is too early. The improved synchronization, in turn, can help improve the freshness of the beverages produced by the beverage robots at the core vending location (e.g., by preventing the beverages from being produced significantly before the order is actually picked up).

For example, the process 900 at block 918 can pause the production of the order for a predetermined amount of time (e.g., 30 seconds, 1 minute, 5 minutes, 10 minutes, 30 minutes, and/or any other suitable amount of time). In another example, the process 900 can pause the production of the order until closer to the estimated pick-up time (e.g., until 5 minutes before the estimated pick-up time). In yet another example, the process 900 can pause the production of the order until a condition to resume is received (e.g., a determination that the user is within a predetermined distance and/or travel time from the vending location). As a result, in some embodiments, the process 900 returns to block 904 after pausing the production of the order to generate an updated estimated pick-up time (e.g., based on updated geographic information from the user device), check the queue(s) at the beverage robots at the core vending location, and/or estimate a new time of completion for the order. The process 900 can then repeat these steps any suitable number of times until the estimated time of completion is generally in sync with the estimated time of arrival. It will be understood, however, that the process 900 can skip any of the steps discussed above during the loop. Purely by way of example, the process 900 can use the original estimated time of arrival for each loop (e.g., skipping block 904) to avoid needing to repeatedly receive geographic information from the user device. Further, in some embodiments, the process 900 places the order back into the queue after the pause, without re-evaluating the estimated time of completion and the estimated arrival time.

In some embodiments, the adjustment at block 918 expedites production of the order (e.g., moving the beverages forward in the queue to help improve the synchronization between the completion time of the order and the order pick-up time when the estimated completion time is too late. For example, the process 900 can expedite beverages associated with high priority orders. In another example, the process 900 can dynamically update the queue based on the geographic information received from multiple user devices (e.g., to prioritize preparing beverages for a first order over a second order when the customer for the first order will arrive before the customer for the second order).

Although the blocks 902-920 of the process 900 are discussed and illustrated in a particular order, the process 900 illustrated in FIG. 9 is not so limited. For example, various steps of the process 900 can be performed in a different order and/or omitted. In these and other embodiments, any of the blocks 902-920 of the process 900 can be performed before, during, and/or after any of the other blocks 902-920 of the process 900. Purely by way of example, in some embodiments, the process 900 can execute all (or a portion of) block 904 (and subblocks 906-910) before, or while, executing all (or a portion) of blocks 912, 914 to estimate the order pick-up time before (or while simultaneously) estimating the time of completion for the order. Moreover, a person of ordinary skill in the relevant art will recognize that the illustrated process 900 can be altered and still remain within these and other embodiments of the present technology.

Figure 10:
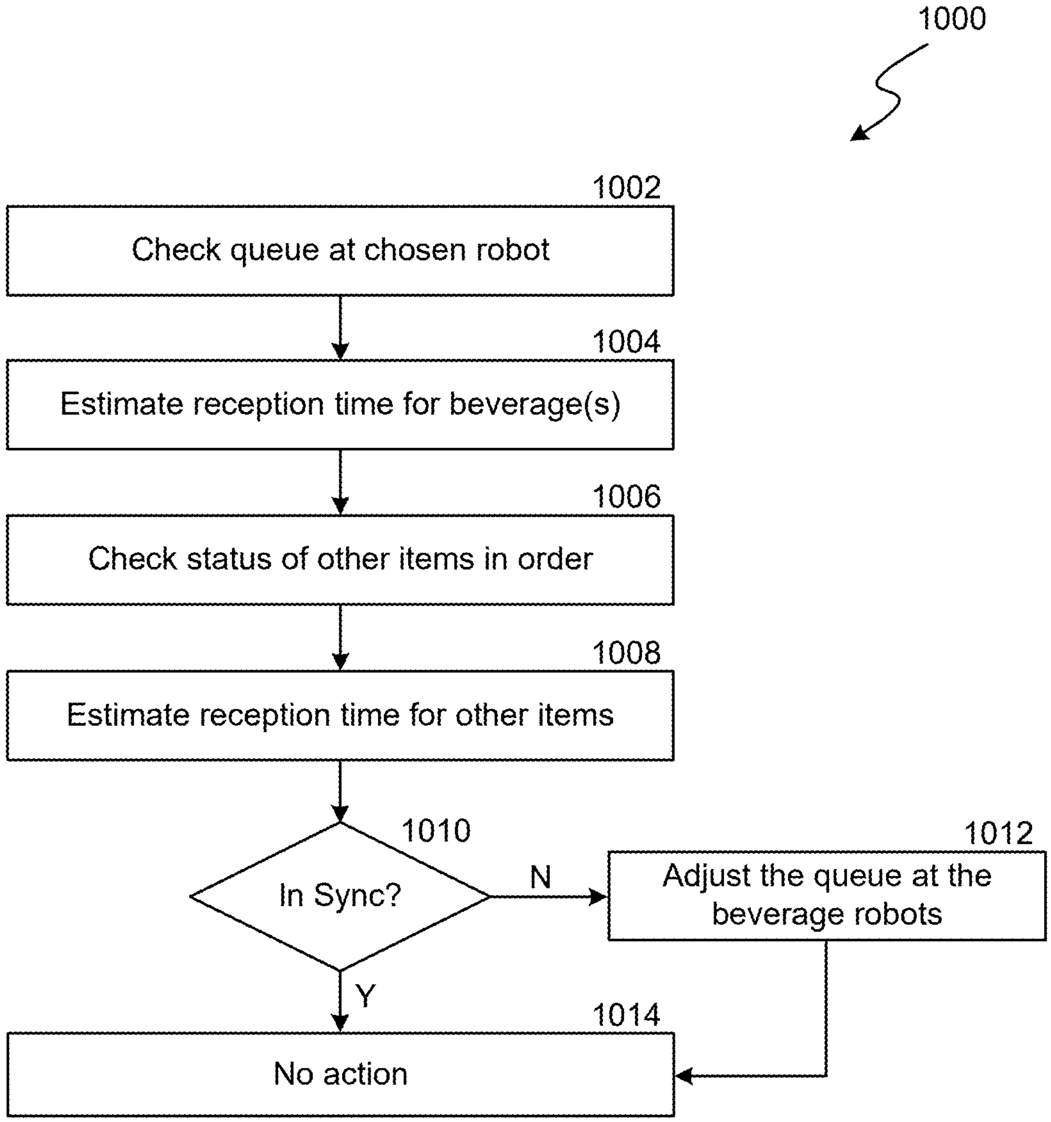
FIG. 10 is a flow diagram of a process for managing a queue at a vending location in accordance with some embodiments of the present technology.

FIG. 10 is a flow diagram of a process 1000 for managing a queue at a vending location in accordance with some embodiments of the present technology. More specifically, the process 1000 illustrated in FIG. 10 can be executed to help synchronize the production of orders (and/or portions of an order) with the completion of other items in an order (e.g., food items in the order, other beverages in the order, and/or the like). Similar to the processes discussed above with reference to FIGS. 7-9, the process 1000 can be executed by any suitable computing device (or combination of computing devices) in a mesh network of the type discussed above. Purely by way of example, the process 1000 (or any suitable portion thereof) can be executed by a computing device housing the platform 300 discussed above with reference to FIG. 3; the subsystem 400 discussed above with reference to FIG. 4; and/or any of the components of the mesh network 600 discussed above with reference to FIG. 6. Further, although discussed herein in the context of being executed entirely within a single component (e.g., entirely within the remote system 610 of FIG. 6, within one of the beverage robots at the core vending location, and/or the like), it will be understood that a first subset of the process 1000 can be executed by a different computing device than a second subset of the process 1000. Still further, it will be understood that the process 1000 (and/or a generally similar process) can be executed as a part of and/or after the processes discussed above. Purely by way of example, the remote system 610 of FIG. 6 can execute the process 1000 while (or after) scheduling the order (or portions thereof) at block 722 of FIG. 7.

The process 1000 begins at block 1002 by checking a queue of orders at the chosen robot for each beverage in the order. Similar to the discussion above, checking the queue at the beverage robots can include accessing a central database (e.g., at the remote system), querying another database for the queue (e.g., the POS system at the core vending location and/or the like), and/or querying the beverage robots at the core vending location for their current queue.

At block 1004, the process 1000 includes estimating a reception time for each beverage in the order (and/or the order overall) based on the queue information from block 1006. The reception time can be based on an estimated completion time, an estimated pick-up time, an estimated delivery time, and/or the like. As discussed above, the estimated completion time can be based on an estimated preparation time for each of the beverages in the queue(s) plus an estimated preparation time for the beverage(s) in the order. Further, the estimated preparation time can be based on an average preparation time per beverage, preparation times specific to the beverages in the queue(s), and/or the like.

Once completed, however, the beverage(s) in the order may need to be delivered from the core vending location to a peripheral vending location and/or picked up from the core vending location by the customer. Accordingly, the process 1000 can include determining an estimated pick-up time and/or an estimated delivery time (e.g., using geographic information associated with the customer and/or delivery personnel). In a specific, non-limiting example, the process 1000 can include estimating a travel time between a delivery person's current location to help determine an estimated pick-up time (e.g., in conjunction with the estimated completion time), then estimate a travel time between the core vending location and the peripheral vending location after the estimated pick-up time to determine the estimated reception time.

At block 1006, the process 1000 includes checking the status of other items in an order, such as food items, other beverages (assigned to other beverage robots and/or being manually prepared), and/or the like. Checking the status of the other items at block 1006 can include accessing a central, updated database (e.g., at the remote system), querying another database for the queue (e.g., the POS system at the core vending location and/or the like), and/or querying any other suitable system.

At block 1008, the process 1000 includes estimating a reception time for the other items based on the status of the other items from block 1006. Similar to the discussion above, the reception time can be based on an estimated completion time, an estimated pick-up time, an estimated delivery time, and/or the like. The estimated completion time can be based on an average preparation time for each item in the queue ahead of the other items in the order, preparation times specific to the items in the queue, a remaining preparation time for the other items once started, and/or the like. Additionally, or alternatively, the estimated completion time for the other items can be based on inputs from a user of other subsystems in the mesh network, such as various personnel at a peripheral vending location and/or personnel at the core vending location. Once completed, however, a customer can pick up the other items and/or the other items can be delivered to the core vending location to be picked-up along with the beverage(s) in the order. Accordingly, in some embodiments, the process 1000 at block 1008 includes determining a delivery time between a peripheral vending location and the core vending location after the estimated completion time.

At decision block 1010, if the estimated reception times are generally in sync, the process 1000 continues to block 1014 and takes no action (e.g., allowing the beverage(s) to be prepared in their current queue position).

In various embodiments, for the process 1000 to consider the estimated completion times to be generally in sync, the estimated completion times must be within 1 minute, within 2 minutes, within 5 minutes, within 10 minutes, within 15 minutes, and/or within any other suitable period of the estimated arrival time. In some embodiments, the process 1000 accounts for travel time between vending locations when checking whether the reception times are in sync. For example, a customer can pick-up the other items (e.g., food items) from a peripheral vending location then travel to the core vending location to pick up the beverages (or vice versa). Accordingly, in such embodiments, the process 1000 can checks whether the reception time for the beverage(s) is within a predetermined time (e.g., within 1 minute, 2 minutes, 5 minutes, 10 minutes, 15 minutes, and/or the like) of the reception time for the other items plus an estimated travel time between the vending locations.

Conversely, if the estimated completion times are not generally in sync at decision block 1010, the process 1000 continues to block 1012 to adjust the queue at the beverage robots. Similar to the discussion above, the adjustment at block 1012 pauses the production of the order (e.g., by moving the beverages back in the queue and/or taking the beverages out of the queue for a period of time) to help improve the synchronization between the reception times. The improved synchronization, in turn, can help improve the freshness of the beverages produced by the beverage robots at the core vending location when they are picked up. The pause can be for a predetermined amount of time, until closer to the estimated completion time of the other items, until a condition to resume is received (e.g., a detection that the other items are past a predetermined step (e.g., out of the oven)), and/or the like. Accordingly, for example, the process 1000 can return to block 1002 after pausing the production of the order to check for an updated status on the other items, determine an updated estimated completion time for the other items, check the queue(s) at the chosen robot(s), and/or estimate a new time of completion for the beverage(s) in the order.

Alternatively, similar to the discussion above, the adjustment at block 1012 expedites the production of the order (e.g., moving the beverages forward in the queue to help improve the synchronization between the completion time of the order and the order pick-up time when the estimated completion time is too late). For example, the process 1000 can expedite beverages associated with high-priority orders. In another example, the process 1000 can dynamically update the queue based on the geographic information received from multiple user devices (e.g., to prioritize preparing beverages for a first order over a second order when the other items for the first order will be received before the other items for the second order).

The process 1000 can then repeat these steps any suitable number of times until the estimated completion times are generally in sync. It will be understood, however, that the process 1000 can skip any of the steps discussed above during the loop. Purely by way of example, the process 1000 can use the original estimated completion time for the other items for each loop (e.g., skipping block 1002 and block 1004). Further, in some embodiments, the process 1000 places the order back into the queue after the pause, without re-evaluating the estimated completion time of the other orders and/or without checking the queue at the chosen robot.

Although the blocks 1002-1014 of the process 1000 are discussed and illustrated in a particular order, the process 1000 illustrated in FIG. 10 is not so limited. For example, various steps of the process 1000 can be performed in a different order and/or omitted. In these and other embodiments, any of the blocks 1002-1014 of the process 1000 can be performed before, during, and/or after any of the other blocks 1002-1014 of the process 1000. Purely by way of example, in some embodiments, the process 1000 can execute all (or a portion of) blocks 1002, 1004 before, or while, executing all (or a portion) of blocks 1006, 1008 to estimate the reception time for the other items in the order before (or while simultaneously) estimating the reception time for the beverages in the order. Moreover, a person of ordinary skill in the relevant art will recognize that the illustrated process 1000 can be altered and still remain within these and other embodiments of the present technology.

Figure 11:
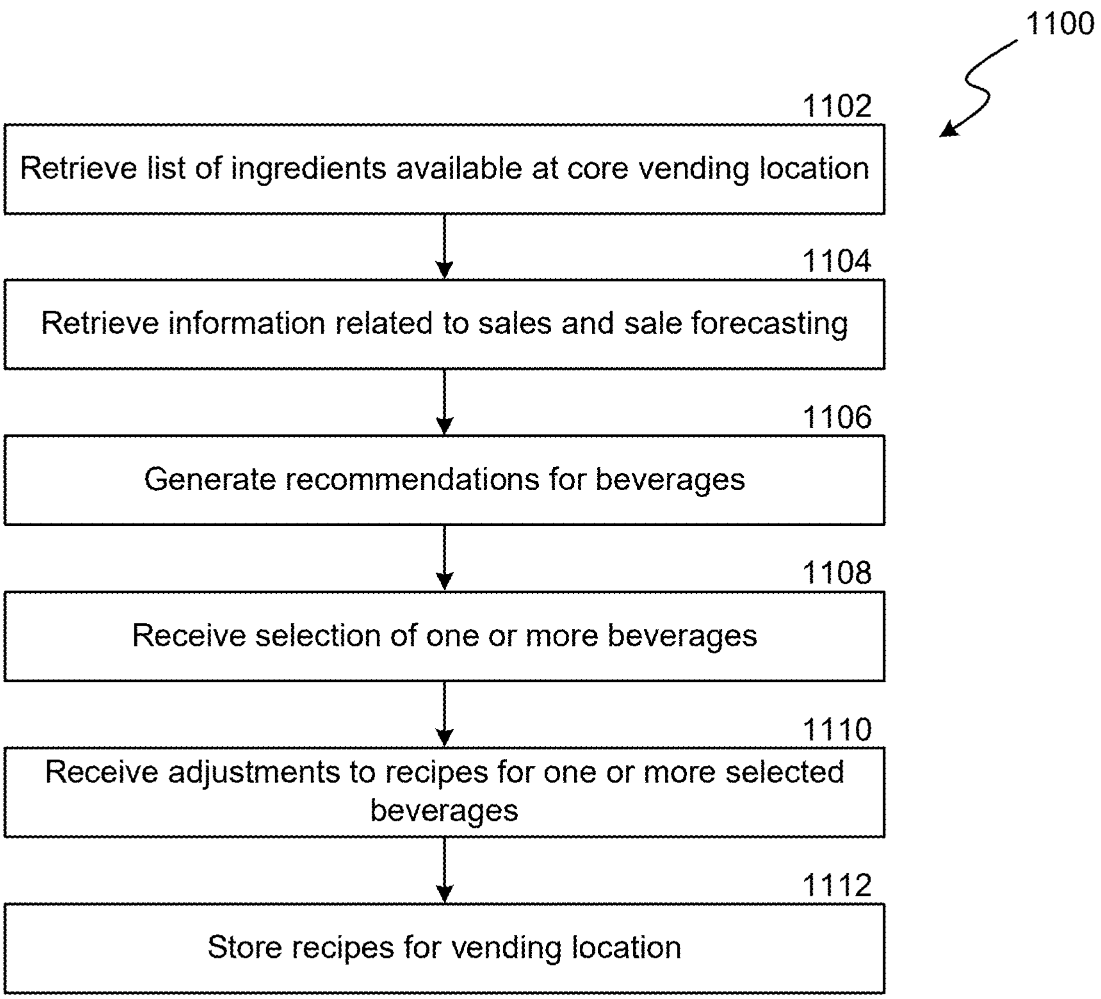
FIG. 11 is a flow diagram of a process for managing menu offerings within a mesh network in accordance with some embodiments of the present technology.

FIG. 11 is a flow diagram of a process 1100 for managing menu offerings within a mesh network in accordance with some embodiments of the present technology. More specifically, the process 1100 illustrated in FIG. 11 can be executed to help a vending location (e.g., a new vending location) customize their menu offerings based on menu items available in the mesh network, menu items at the vending locations, sales history, trends, demographic information, and/or the like. Similar to the processes discussed above with reference to FIGS. 7-10, the process 1100 can be executed by any suitable computing device (or combination of computing devices) in a mesh network of the type discussed above. Purely by way of example, the process 1100 (or any suitable portion thereof) can be executed by a computing device housing the platform 300 discussed above with reference to FIG. 3; the subsystem 400 discussed above with reference to FIG. 4; and/or any of the components of the mesh network 600 discussed above with reference to FIG. 6. Further, although discussed herein in the context of being executed entirely within a single component (e.g., entirely within the remote system 610 of FIG. 6, within one of the beverage robots at the core vending location, and/or the like), it will be understood that a first subset of the process 1100 can be executed by a different computing device than a second subset of the process 1100.

The process 1100 can begin at block 1102 by retrieving a list of ingredients available at each of the beverage robots at the core vending location. As discussed above, the ingredients available at each of the beverage robots dictate the range of different beverages (and customizations to the beverages) that each of the beverage robots can prepare. For example, a first beverage robot may have ingredients A-F while a second beverage robot may have ingredients G-M. The first beverage robot can prepare beverages with recipes that use only a subset (or all) of the ingredients A-F while the second beverage robot can prepare beverages with recipes that use only a subset (or all) of the ingredients G-M. As also discussed above, retrieving the list of ingredients can include retrieving a list of ingredients available (e.g., in stock, stored, etc.) at each beverage robot from the central database, retrieving the list from another database, querying each of the beverage robots in the core vending location, and/or the like.

At block 1104, the process 1100 includes retrieving information related to sales and sale forecasting for the mesh network. For example, the process 1100 can retrieve information on the menu offerings and historical sales at one or more other vending locations in the mesh network. The menu offerings and historic sales can help identify popular beverages, unpopular beverages, beverage types that already have numerous options in the mesh network, beverage types that do not have many offerings in the mesh network, and/or the like. In another example, the process 1100 can retrieve demographic information around the vending location that may be related to beverage preferences. In a specific, non-limiting example, the information can identify that the vending location is adjacent to a university where caffeine-related beverages will likely have high sales. In still further examples, the process 1100 can retrieve information on seasonal trends, other items offered at the vending location (e.g., food items, bottled beverages, and/or the like), trend forecasts, and/or the like.

At block 1106, the process 1100 includes generating recommendations for the vending location based on the available ingredients retrieved at block 1102 and the information retrieved at block 1104. In various examples, the recommendations can be based on popular beverage items, new beverages that are not offered at other vending locations in the mesh network, reducing overlap with other vending locations (e.g., increasing a diversity of beverages offered within the mesh network), beverages that match well with the other items offered at the vending location, seasonal trends, and/or the like. Purely by way of example, a first recommendation may be based on a lemonade recipe that has high sales within the mesh network. A second recommendation may be based on a juice blend that is predicted to match a food genre at the vending location well. And a third recommendation may be based on a forecast for an upcoming season. In some embodiments, the options are generated using various artificial intelligence and/or machine learning models. Purely by way of example, the process 1100 can employ a neural network to generate the recommendations based on the available ingredients and the information retrieved at block 1104. The generated recommendations can then be presented to a user at the vending location (e.g., to a manager through a user device, a computing system, and/or the like).

At block 1108, the process 1100 includes receiving a selection of one or more beverages to offer on the menu at the vending location. The selection can be for one or more of the recommended beverages, one or more beverages from a catalog of beverages based on the list of ingredients retrieved at block 1102, and/or one or more custom beverages. Further, at optional block 1110, the process 1100 includes receiving one or more adjustments to the recipes for the selected beverages. The adjustments can be to the volume of ingredients used in the recipe, the ratio of ingredients in the recipe, a serving temperature, and/or the like. Additionally, or alternatively, the adjustments can add and/or remove one or more ingredients (e.g., adding raspberry juice concentrate to a lemonade recipe, removing simple syrup from a juice blend, and/or any other suitable addition and/or removal). The adjustments affect the flavor profile of the beverages prepared according to the recipes, allowing the vending location to customize and/or curate the menu offerings to their preferences. Further, the customized flavor profiles can allow the vending location to stand out to customers, even for similar beverage offerings between vending locations. In a specific, non-limiting example, a first vending location can include more simple syrup in their lemonade recipe as compared to a second vending location, thereby creating a different experience depending on where a customer orders from.

At block 1112, the process 1100 includes storing the selected beverages for the vending location, along with the associated recipes. The selected beverages (and their recipes) can be stored in a central database (e.g., at the remote server), at a POS system at the vending location, at the core vending location, and/or in any other suitable location. As a result, the mesh network can present the beverage offerings to a customer interacting with a POS system for the vending location and/or retrieve the recipes for the beverages in response to an order.

Although the blocks 1102-1112 of the process 1100 are discussed and illustrated in a particular order, the process 1100 illustrated in FIG. 11 is not so limited. For example, various steps of the process 1100 can be performed in a different order and/or omitted. In these and other embodiments, any of the blocks 1102-1112 of the process 1100 can be performed before, during, and/or after any of the other blocks 1102-1112 of the process 1100. Purely by way of example, the process 1100 can omit block 1102 and generate the recommendations at block 1106 without reference to the ingredients currently available at the core vending location (e.g., which can prompt the core vending location to update their ingredients in response to a request for a new beverage). Moreover, a person of ordinary skill in the relevant art will recognize that the illustrated process 1100 can be altered and still remain within these and other embodiments of the present technology.

Figure 12:
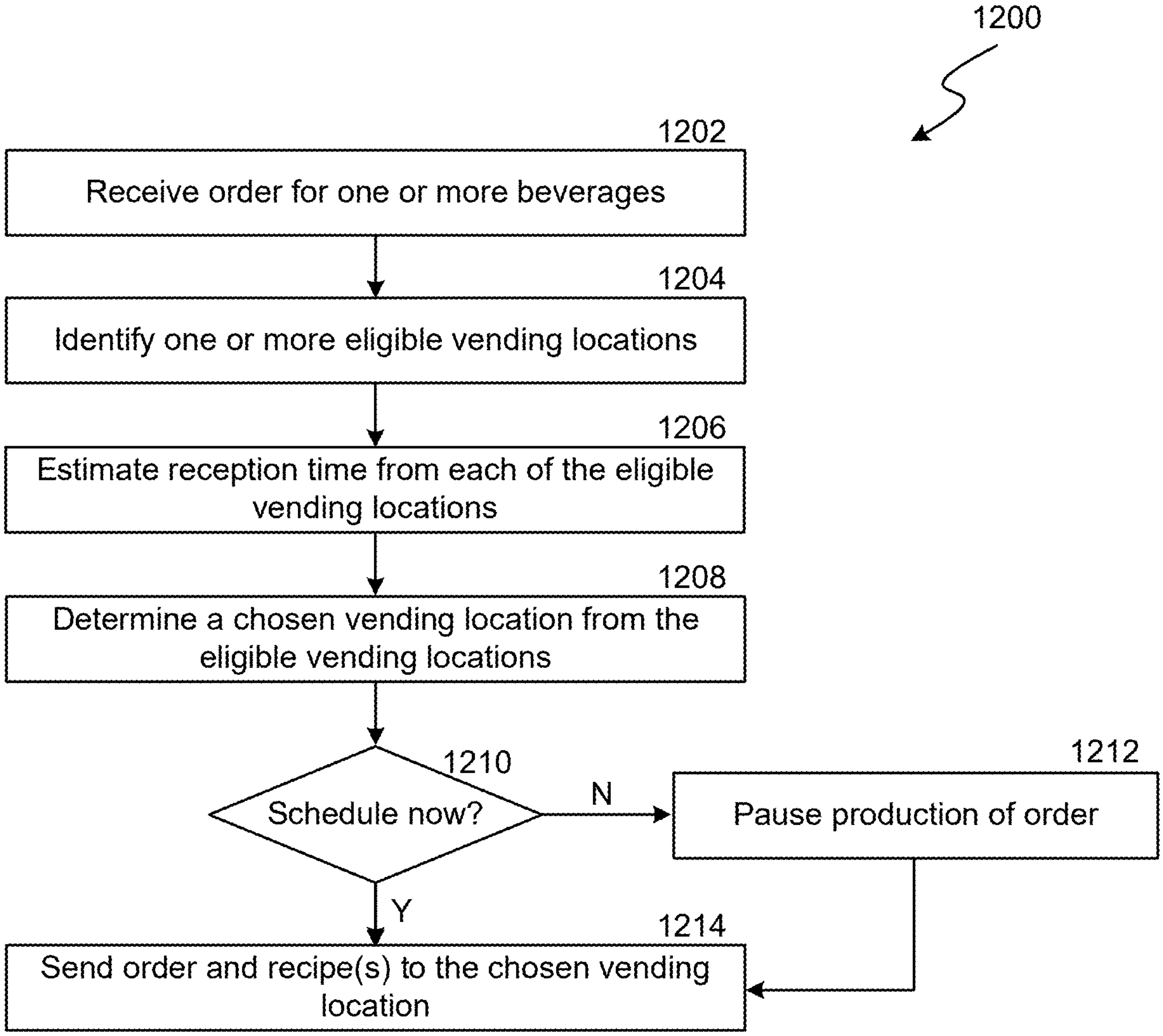
FIG. 12 is a flow diagram of a process for operating a mesh network with a plurality of vending locations in accordance with further embodiments of the present technology.

FIG. 12 is a flow diagram of a process 1200 for operating a mesh network with a plurality of core vending locations in accordance with further embodiments of the present technology. That is, the process 1200 can help manage and/or direct orders for beverages in a mesh network that includes multiple vending locations with beverage robots. Similar to the processes discussed above with reference to FIGS. 7-11, the process 1200 can be executed by any suitable computing device (or combination of computing devices) in a mesh network of the type discussed above. Purely by way of example, the process 1200 (or any suitable portion thereof) can be executed by a computing device housing the platform 300 discussed above with reference to FIG. 3; the subsystem 400 discussed above with reference to FIG. 4; and/or any of the components of the mesh network 600 discussed above with reference to FIG. 6. Further, although discussed herein in the context of being executed entirely within a single component (e.g., entirely within the remote system 610 of FIG. 6, within one of the beverage robots at the core vending location, and/or the like), it will be understood that a first subset of the process 1200 can be executed by a different computing device than a second subset of the process 1200.

The process 1200 begins at block 1202 by receiving an order for one or more beverages. Similar to the discussion above, the order can be received from a POS system at a vending location, an app-based POS system, a web-based POS system, and/or any other suitable POS system. The order can also include additional information, such as a preferred pick-up time, an indication of who will pick-up the order (e.g., the customer, a delivery person, personnel at the vending location, and/or the like), geographic information associated with a person picking up the order, and/or the like.

At block 1204, the process 1200 includes identifying one or more eligible vending locations based on the ingredients available at each beverage robot at each of the core vending locations. Similar to the discussion above, to be eligible, a vending location must have, for each individual beverage in the order, at least one beverage robot available to prepare the individual beverage. The identification can include retrieving a list of ingredients required for each individual beverage, retrieving a list of ingredients available at each beverage robot in each core vending location, and checking the list of available ingredients against the recipe(s).

At block 1206, the process 1200 includes estimating a reception time for the order from each of the eligible vending locations. The reception time is the time a customer will actually receive the order from one of the eligible vending locations based on the time it will take a vending location to produce the order, the time it will take them (or a delivery person) to arrive at the vending locations, and/or the time it will take a delivery person to deliver the order to the customer. For example, the process 1200 at block 1206 can use queue information associated with the beverage robots at each of the eligible vending locations to estimate the completion time for the order at each of the eligible vending locations; use a customer's location and/or a delivery person's location to estimate their arrival time; and/or estimate a travel time for a delivery person to the customer's location. For deliveries, the process 1200 at block 1206 can use the later of the estimated completion time and the estimated arrival time for a delivery person as an estimated pick-up time, then add the estimated delivery time to estimate the reception time.

In a specific, non-limiting example, the eligible vending locations can include a first vending location and a second vending location. For the first vending location, the process 1200 can determine that the beverage robots will produce the order by 1:15 PM and that the customer could arrive at the first vending location at 1:20 PM. The process 1200 will choose 1:20 PM as the estimated reception time for the first vending location. For the second vending location, the process 1200 can determine that the beverage robots will produce the order by 1:11 PM, that the closest delivery person could arrive at the second vending location at 1:10 PM, and that it will take a delivery person 8 minutes to travel from the second vending location to the delivery location. The process 1200 will choose 1:11 PM as the estimated pick-up time for the second vending location, then add 8 minutes to estimate 1:19 PM as the estimated reception time.

At block 1208, the process 1200 includes determining a chosen vending location from the eligible vending locations. In some embodiments, the process 1200 chooses the eligible vending location with the earliest estimated reception time. Returning to the specific example discussed above, the process 1200 can choose the second vending location since the 1:19 PM reception time is the earliest reception time. In some embodiments, the process 1200 chooses the eligible vending location based on the reception time and one or more other factors. For example, the process 1200 can select between estimated reception times within a predetermined range (e.g., 5 minutes) based on which vending location is associated with a smaller time between the estimated completion and the estimated reception time. Returning again to the specific example discussed above, the estimated reception time from the first vending location is 1 minute slower than the estimated reception time from the second vending location. However, the time between the estimated completion and the estimated reception time is 5 minutes, which is less than the 8 minutes between the estimated completion and the estimated reception at the second vending location. Accordingly, if the 1-minute difference in reception time is within an acceptable range (and/or the customer is willing to pick the order up), the process 1200 can choose the first vending location to increase a freshness of the order when it is received by the customer.

In some embodiments, the determination at block 1208 includes assigning a delivery person (e.g., the closest delivery person) to the order. The assignment at block 1208 can include sending information about the order, the chosen vending location, and/or the delivery location to the delivery person. Additionally, the assignment at block 1208 can include updating a status of the delivery person in the mesh network (e.g., adding information about the delivery and/or the delivery route to geographic information for the delivery person, taking the delivery person out of a queue of eligible delivery persons, and/or the like). As a result, the assignment at block 1208 can help prevent future iterations through the process 1200 from choosing a vending location based on the location and/or availability of the assigned delivery person without considering the travel time associated with the assigned delivery.

At decision block 1210, the process 1200 determines whether to schedule the order at the chosen vending location now. For example, if the estimated completion time for the order is not in sync with the estimated pick-up time, the process 1200 at decision block 1210 can decide to move to block 1212 to pause the production of the order. The pause can be for any suitable period of time, until the process 1200 determines the estimated completion time is in sync with the estimated pick-up time, and/or a restart condition is detected (e.g., that the delivery person is within 5 minutes of the chosen vending location). As discussed above, the pause can help improve the synchronization between the completion time of the order and the order pick-up time and, in turn, help improve the freshness of the beverages produced by the beverage robots at the selected vending location.

Conversely, if the estimated completion time is generally in sync with the estimated pick-up time, the process 1200 at decision block 1210 can decide to move to block 1214. At block 1214, the process 1200 includes sending the order and recipes associated with each of the beverage(s) in the order to the chosen vending location. As a result, the process 1200 can cause the beverage robot(s) in the chosen vending location to produce the order.

Although the blocks 1202-1214 of the process 1200 are discussed and illustrated in a particular order, the process 1200 illustrated in FIG. 12 is not so limited. For example, various steps of the process 1200 can be performed in a different order and/or omitted. In these and other embodiments, any of the blocks 1202-1214 of the process 1200 can be performed before, during, and/or after any of the other blocks 1202-1214 of the process 1200. Moreover, a person of ordinary skill in the relevant art will recognize that the illustrated process 1200 can be altered and still remain within these and other embodiments of the present technology.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A method for operating one or more beverage robots in a first vending location, the method comprising:

receiving an order for a beverage to be prepared by the one or more beverage robots in the first vending location, wherein the beverage is associated with a recipe requiring two or more ingredients, and wherein the recipe is specific to a menu at a second vending location;

retrieving the recipe for the beverage;

determining a planned pick-up time for the order at the first vending location;

checking a queue at the one or more beverage robots in the first vending location, wherein the queue is associated with a number of beverages already assigned to each of the one or more beverage robots; and scheduling the beverage to be prepared by one of the one or more beverage robots in the first vending location.

2. The method of example 1, wherein scheduling the beverage to be prepared comprises placing the order in the queue of orders at the first vending location.

3. The method of any of examples 1 and 2, further comprising pausing production of the order before scheduling the beverage to be prepared based at least partially on the planned pick-up time and the queue at the one or more beverage robots in the first vending location.

4. The method of any of examples 1-3, further comprising:

receiving geographic information from a user device associated with the order;

determining an estimated arrival time for a user of the user device at the first vending location based on the geographic information from the user device;

estimating a completion time for the order based on the queue of orders at the one or more beverage robots;

determining that the estimated arrival time and the estimated completion time for the order are not in sync; and adjusting the queue of orders for at least one of the one or more beverage robots.

5. The method of example 4, wherein adjusting the queue of orders comprises moving the order lower in the queue of orders so that the one or more beverage robots prepare the order before the estimated completion time for the order.

6. The method of example 4, wherein adjusting the queue of orders comprises moving the order higher in the queue of orders so that the one or more beverage robots prepare the order after the estimated completion time for the order.

7. The method of any of examples 1-6, further comprising:

estimating a completion time for the beverage in the order based on the queue of orders at the one or more beverage robots;

checking a status of other items in the order;

estimating a reception time of the other items in the order based on the status;

determining that the completion time for the beverage in the order and the reception time of the other items in the order are not in sync; and adjusting the queue of orders for at least one of the one or more beverage robots.

8. The method of any of examples 1-7, wherein determining the planned pick-up time comprises determining a planned delivery method for the order.

9. The method of any of examples 1-8, wherein scheduling the beverage to be prepared comprises:

for each individual beverage robot in the one or more beverage robots, checking available ingredients at the individual beverage robot to identify one or more eligible beverage robots;

determining a chosen beverage robot from the one or more beverage robots based on the queue at the one or more eligible beverage robots; and assigning the order to the chosen beverage robot, wherein assigning the order causes the order to be added to the queue at the chosen beverage robot and causes the chosen beverage robot to prepare the beverage when the chosen beverage robot processes the order.

10. The method of example 9, wherein determining the chosen beverage robot comprises identifying a shortest wait time from the one or more eligible beverage robots based on the queue at each of the one or more eligible beverage robots.

11. The method of any of examples 9 and 10, wherein determining the chosen beverage robot comprises identifying an estimated wait time from the one or more eligible beverage robots that is a closest match to the planned pick-up time.

12. A non-transitory computer-readable storage medium storing instructions that, when executed by a computing system, cause the computing system to perform operations for controlling operation of system having one or more beverage robots at a core vending location, the operations comprising:

receiving a plurality of orders from a plurality of peripheral vending locations, wherein each individual order in the plurality of orders includes one or more beverages, and wherein each of the one or more beverages is associated with associated with an individual recipe; and for each individual order from the plurality of orders:

retrieving, for each individual beverage in the one or more beverages in the individual order, the individual recipe for the individual beverage;

checking a queue at the one or more beverage robots in the core vending location, wherein the queue is associated with a number of beverages already assigned to each of the one or more beverage robots; and scheduling each individual beverage in the one or more beverages in the individual order to be prepared by one of the one or more beverage robots.

13. The non-transitory computer-readable storage medium of example 12, wherein scheduling each individual beverage in the one or more beverages in the individual order comprises, for each individual beverage:

for each individual beverage robot in the one or more beverage robots, checking available ingredients at the individual beverage robot to identify one or more eligible beverage robots;

determining a chosen beverage robot from the one or more beverage robots based on the queue at the one or more eligible beverage robots; and assigning the individual beverage to the chosen beverage robot, wherein assigning the individual beverage causes the chosen beverage robot to add the individual beverage to the queue at the chosen beverage robot and prepare the individual beverage.

14. The non-transitory computer-readable storage medium of claim 12, wherein the operations further comprise, for each individual order from the plurality of orders, estimating a pick-up time for the individual order, wherein scheduling each individual beverage in the one or more beverages in the individual order is based at least partially on the estimated pick-up time for the individual order.

15. The non-transitory computer-readable storage medium of example 14, wherein estimating the pick-up time for the individual order comprises:

checking a location of a user device associated with the individual order; and estimating an arrival time based on travel between the location of the user device and the core vending location.

16. The non-transitory computer-readable storage medium of any of examples 12-15, wherein the operations further comprise, for each individual order from the plurality of orders, for each individual beverage in the one or more beverages in the individual order, determining one or more adjustments to the individual recipe based on customizations in the individual order.

17. The non-transitory computer-readable storage medium of any of examples 12-16, wherein a first order from the plurality of orders further includes one or more other items to be prepared at a corresponding peripheral vending location, and wherein the operations further comprise:

estimating a completion time for the one or more beverages in the first order based on the queue at the one or more beverage robots at the core vending location;

checking a status of other items in the first order at the corresponding peripheral vending location;

estimating a reception time at the corresponding peripheral vending location for the other items in the first order based on the status;

determining that the completion time and the reception time are not in sync; and pausing preparation of the one or more beverages in the first order.

18. A method for operating a mesh network of vending locations, the method comprising:

receiving an order requesting a beverage, wherein the beverage is associated with a recipe associated with a menu at a first vending location;

for each individual vending location from a plurality of second vending locations, checking ingredients available at one or more beverage robots at the individual vending location to identify one or more eligible vending locations available to prepare the beverage;

for each individual eligible vending location, checking a queue at the one or more beverage robots at the eligible vending location, wherein the queue comprises a number of individual beverages already assigned to the eligible vending location to be prepared by the one or more beverage robots;

determining a chosen vending location from the one or more eligible robots to prepare the beverage based at least partially on the queue at each of the one or more eligible vending locations; and sending the order to the chosen vending location, wherein the sending the order to the chosen vending location comprises transmitting the order to the one or more beverage robots at the chosen vending location to cause the one or more beverage robots to prepare the beverage.

19. The method of example 18, further comprising:

checking a location of a user device associated with the order; and determining an estimated reception time from each of the one or more eligible vending locations based at least partially on the location of the user device and the queue at each of the one or more eligible vending locations, wherein determining the chosen vending location is based at least partially on an earliest estimated reception time.

20. The method of example 19, wherein determining the user device is associated with a delivery person for the first vending location, and wherein determining the estimated reception time includes estimating a travel time between the location of the user device, each of the one or more eligible vending locations, and the first vending location.

Conclusion

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Further, the terms "approximately" and "about" are used herein to mean within at least within 10% of a given value or limit. Purely by way of example, an approximate ratio means within 10% of the given ratio.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments.

Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method for operating one or more beverage robots in a first vending location, the method comprising:
receiving an order for a beverage to be prepared by the one or more beverage robots in the first vending location, wherein the beverage is associated with a recipe that is specific to a second vending location;
estimating a pick-up time for the order at the first vending location;
checking a queue at the one or more beverage robots in the first vending location, wherein the queue is associated with a number of beverages already assigned to each of the one or more beverage robots; and
scheduling the beverage to be prepared by a chosen beverage robot from the one or more beverage robots in the first vending location, wherein scheduling the beverage comprises placing the beverage in the queue for the chosen beverage robot based at least partially on the estimated pick-up time, and wherein placing the beverage in the queue for the chosen beverage robot causes the beverage to be prepared by the chosen robot.

2. The method of claim 1, further comprising retrieving the recipe for the beverage specific to the second vending location.

3. The method of claim 1, further comprising pausing production of the order before scheduling the beverage to be prepared based at least partially on the estimated pick-up time and the queue at the one or more beverage robots in the first vending location.

4. The method of claim 1, wherein:
estimating the pick-up time comprises
receiving geographic information from a user device associated with the order; and
determining an estimated arrival time for a user of the user device at the first vending location based on the geographic information from the user device; and
the method further comprises:
estimating a completion time for the beverage based on the queue at the chosen beverage robot;
determining that the estimated arrival time and the estimated completion time for the beverage are not in sync; and
adjusting the queue at the chosen beverage robot to synchronize the arrival time and the estimated completion time for the beverage.

5. The method of claim 4, wherein adjusting the queue comprises moving the beverage in the order lower in the queue so that the chosen beverage robot prepares the beverage before the estimated completion time.

6. The method of claim 4, wherein adjusting the queue comprises moving the order higher in the queue so that the chosen beverage robot prepares the beverage after the estimated completion time.

7. The method of claim 1, further comprising:
estimating a completion time for the beverage in the order based on the queue at the chosen beverage robot;
checking a status of other items in the order;
estimating a reception time of the other items in the order based on the status;
determining that the completion time for the beverage in the order and the reception time of the other items in the order are not in sync; and
adjusting the queue at the chosen beverage robot.

8. The method of claim 1, wherein estimating the pick-up time comprises determining a planned delivery method for the order.

9. The method of claim 1, wherein scheduling the beverage to be prepared comprises:
for each individual beverage robot in the one or more beverage robots, checking available ingredients at the individual beverage robot to identify one or more eligible beverage robots;
determining the chosen beverage robot from the one or more beverage robots based on the queue at the one or more eligible beverage robots; and
assigning the order to the chosen beverage robot, wherein assigning the order causes the order to be added to the queue at the chosen beverage robot.

10. The method of claim 9, wherein determining the chosen beverage robot comprises identifying a shortest wait time from the one or more eligible beverage robots based on the queue at each of the one or more eligible beverage robots.

11. The method of claim 9, wherein determining the chosen beverage robot comprises identifying an estimated wait time from the one or more eligible beverage robots that is a closest match to the estimated pick-up time.

12. A non-transitory computer-readable storage medium storing instructions that, when executed by a computing system, cause the computing system to perform operations for controlling operation of system having one or more beverage robots at a core vending location, the operations comprising:
receiving a plurality of orders from a plurality of peripheral vending locations, wherein each individual order in the plurality of orders includes one or more beverages, and wherein each of the one or more beverages is associated with associated with an individual recipe; and
for each individual order from the plurality of orders:
retrieving, for each individual beverage in the one or more beverages in the individual order, the individual recipe for the individual beverage;
checking a queue at the one or more beverage robots in the core vending location, wherein the queue is associated with a number of beverages already assigned to each of the one or more beverage robots; and
scheduling each individual beverage in the one or more beverages in the individual order to be prepared by one of the one or more beverage robots.

13. The non-transitory computer-readable storage medium of claim 12, wherein scheduling each individual beverage in the one or more beverages in the individual order comprises, for each individual beverage:
for each individual beverage robot in the one or more beverage robots, checking available ingredients at the individual beverage robot to identify one or more eligible beverage robots;
determining a chosen beverage robot from the one or more beverage robots based on the queue at the one or more eligible beverage robots; and
assigning the individual beverage to the chosen beverage robot, wherein assigning the individual beverage causes the chosen beverage robot to add the individual beverage to the queue at the chosen beverage robot and prepare the individual beverage.

14. The non-transitory computer-readable storage medium of claim 12, wherein the operations further comprise, for each individual order from the plurality of orders, estimating a pick-up time for the individual order, wherein scheduling each individual beverage in the one or more beverages in the individual order is based at least partially on the estimated pick-up time for the individual order.

15. The non-transitory computer-readable storage medium of claim 14, wherein estimating the pick-up time for the individual order comprises:

checking a location of a user device associated with the individual order; and estimating an arrival time based on travel between the location of the user device and the core vending location.

16. The non-transitory computer-readable storage medium of claim 12, wherein the operations further comprise, for each individual order from the plurality of orders, for each individual beverage in the one or more beverages in the individual order, determining one or more adjustments to the individual recipe based on customizations in the individual order.

17. The non-transitory computer-readable storage medium of claim 12, wherein a first order from the plurality of orders further includes one or more other items to be prepared at a corresponding peripheral vending location, and wherein the operations further comprise:

estimating a completion time for the one or more beverages in the first order based on the queue at the one or more beverage robots at the core vending location;

checking a status of other items in the first order at the corresponding peripheral vending location;

estimating a reception time at the corresponding peripheral vending location for the other items in the first order based on the status;

determining that the completion time and the reception time are not in sync; and pausing preparation of the one or more beverages in the first order.

18. A method for operating a mesh network of vending locations, the method comprising:

receiving an order requesting a beverage, wherein the beverage is associated with a recipe associated with a menu at a first vending location;

for each individual vending location from a plurality of second vending locations, checking ingredients available at one or more beverage robots at the individual vending location to identify one or more eligible vending locations available to prepare the beverage;

for each individual eligible vending location, checking a queue at the one or more beverage robots at the eligible vending location, wherein the queue comprises a number of individual beverages already assigned to the eligible vending location to be prepared by the one or more beverage robots;

determining a chosen vending location from the one or more eligible robots to prepare the beverage based at least partially on the queue at each of the one or more eligible vending locations; and sending the order to the chosen vending location, wherein the sending the order to the chosen vending location comprises transmitting the order to the one or more beverage robots at the chosen vending location to cause the one or more beverage robots to prepare the beverage.

19. The method of claim 18, further comprising:

checking a location of a user device associated with the order; and determining an estimated reception time from each of the one or more eligible vending locations based at least partially on the location of the user device and the queue at each of the one or more eligible vending locations, wherein determining the chosen vending location is based at least partially on an earliest estimated reception time.

20. The method of claim 19, wherein determining the user device is associated with a delivery person for the first vending location, and wherein determining the estimated reception time includes estimating a travel time between the location of the user device, each of the one or more eligible vending locations, and the first vending location.

* * * * *